US012659555B2

(12) United States Patent
Mazaheri et al.

(10) Patent No.: US 12,659,555 B2
(45) **Date of Patent: \*Jun. 16, 2026**

(54) MULTIMEDIA SCENE BREAK DETECTION

(71) Applicant: Tubi, Inc., San Francisco, CA (US)

(72) Inventors: Amir Mazaheri, Mountain View, CA (US); John Trenkle, Albany, CA (US); Jaya Kawale, San Jose, CA (US); Kevin Edward Corcoran, Media, PA (US); Dennis Paul Yost, Salado, TX (US); Anthony Albert Truyoo-Broque, Manhattan Beach, CA (US); Matthew Adam Elliott, Portland, OR (US)

(73) Assignee: Tubi, Inc., San Francisco, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/964,224

(22) Filed: Nov. 29, 2024

(65) Prior Publication Data

US 2025/0097549 A1 Mar. 20, 2025

Related U.S. Application Data

(63) Continuation of application No. 18/301,971, filed on Apr. 17, 2023, now Pat. No. 12,192,600.

(51) Int. Cl.
*H04N 21/234* (2011.01)
*G11B 27/19* (2006.01)
(Continued)

(52) U.S. Cl.
CPC ......... *H04N 21/8549* (2013.01); *G11B 27/19* (2013.01); *H04N 21/233* (2013.01);
(Continued)

(58) Field of Classification Search
None
See application file for complete search history.

(56) References Cited

U.S. PATENT DOCUMENTS 8,311,390 B2 11/2012 Berry
10,856,053 B1 12/2020 Shi
(Continued)

OTHER PUBLICATIONS

Wikipedia Contributors. "Multi-armed bandit." Wikipedia, Wikimedia Foundation, Feb. 28, 2023., https://en.wikipedia.org/wiki/Multi-armed_bandit. Accessed Feb. 28, 2023.
(Continued)

*Primary Examiner* — Brian T Pendleton
*Assistant Examiner* — Jean D Saint Cyr
(74) *Attorney, Agent, or Firm* — Redbrick IP, P.C.

(57) ABSTRACT

A system and method for multimedia scene break detection, including: a computer processor, a scene break detection service executing on the computer processor and comprising functionality to: (i) receive a request for scene break detection on a media item, (ii) identify a set of candidate scene break timestamps selected based on analysis of an audio component of the media item and a video component of the media item, (iii) execute a computer vision scoring model for each candidate scene break timestamp to generate a score representing a visual distance between a first set of proximal frames and a second set of proximal frames of the candidate scene break timestamp, and (iv) select, based at least on the score of each of the set of candidate scene break timestamps, a final set of scene break timestamps for the media item.

20 Claims, 16 Drawing Sheets

(51) Int. Cl.

| | |
|---|---|
| *H04N 21/233* | (2011.01) |
| *H04N 21/236* | (2011.01) |
| *H04N 21/262* | (2011.01) |
| *H04N 21/433* | (2011.01) |
| *H04N 21/4545* | (2011.01) |
| *H04N 21/482* | (2011.01) |
| *H04N 21/81* | (2011.01) |
| *H04N 21/845* | (2011.01) |
| *H04N 21/8549* | (2011.01) |

(52) U.S. Cl.
CPC ..... *H04N 21/23418* (2013.01); *H04N 21/812* (2013.01); *H04N 21/8456* (2013.01)

(56) References Cited

U.S. PATENT DOCUMENTS

| | | | |
|---|---|---|---|
| 11,336,930 | B1 | 5/2022 | Gupta |
| 11,490,163 | B1 | 11/2022 | Das et al. |
| 11,748,988 | B1 | 9/2023 | Chen |
| 12,259,895 | B1 | 3/2025 | Huang |
| 2008/0263583 | A1 | 10/2008 | Heath |
| 2009/0282016 | A1* | 11/2009 | Gabrilovich ........... G06Q 30/02 |
| | | | 707/999.005 |
| 2012/0242900 | A1 | 9/2012 | Huang |
| 2013/0204825 | A1 | 8/2013 | Su |
| 2015/0331908 | A1 | 11/2015 | Duffy |
| 2017/0041684 | A1* | 2/2017 | Krishnamurthy .... H04N 21/233 |
| 2018/0192158 | A1* | 7/2018 | Smith .............. H04N 21/23418 |
| 2020/0193552 | A1* | 6/2020 | Turkelson ............ G06F 18/213 |
| 2021/0065719 | A1 | 3/2021 | Wang |
| 2022/0138805 | A1* | 5/2022 | Lemmons .......... G06Q 30/0205 |
| | | | 705/14.72 |
| 2022/0150582 | A1 | 5/2022 | Nishimura |
| 2023/0188792 | A1 | 6/2023 | Sahasi |
| 2024/0007717 | A1 | 1/2024 | Gupta |
| 2024/0259634 | A1 | 8/2024 | Koshy |
| 2024/0411896 | A1 | 12/2024 | Myers |
| 2025/0077552 | A1 | 3/2025 | Tsai et al. |
| 2025/0103602 | A1 | 3/2025 | Jha |
| 2025/0272317 | A1 | 8/2025 | Aggarwal |

OTHER PUBLICATIONS

Your go-to interactive machine learning library. Feb. 28, 2923., https://vowpalwabbit.org/. Accessed Feb. 28, 2023.

Fox Corporation Unveils Atlas https://www.foxcorporation.com/news/business/2022/fox-corporation-unveils-atlas/.

Find Your Next Obsession with Tubi's New GPT-4 Powered Content Discovery Feature https://corporate.tubitv.com/press/find-your-next-obsession-with-tubis-new-gpt-4-powered-content-discovery-feature/.

\* cited by examiner

| | Shot 13 | Shot 14 | Shot 15 | Shot 16 | Shot 17 |
|---|---|---|---|---|---|
| Shot 08 | 23.3202398 | 18.7491646 | 21.1501004 | 18.3877823 | 26.7726858 |
| Shot 09 | 23.4684305 | 20.515406 | 22.8695139 | 21.8375574 | 26.527088 |
| Shot 10 | 23.28805291 | 19.0440498 | 22.48778375 | 20.6327277 | 26.11152543 |
| Shot 11 | 23.04184 | 19.7846092 | 20.2395673 | 23.2711366 | 27.0563286 |
| Shot 12 | 15.3037902 | 18.1303752 | 19.9157141 | 21.9210806 | 22.1718802 |

MULTIMEDIA SCENE BREAK DETECTION

CROSS-REFERENCE TO RELATED APPLICATIONS

This application is a continuation of co-pending U.S. patent application Ser. No. 18/301,971, filed Apr. 17, 2023, entitled "MULTIMEDIA SCENE BREAK DETECTION," Amir Mazaheri, et al. U.S. patent application Ser. No. 18/301,971 is related to U.S. patent application Ser. No. 18/301,965, filed Apr. 17, 2023, entitled "ADVERTISE-MENT BREAK DETECTION", Amir Mazaheri, et al. Both U.S. patent application Ser. No. 18/301,971 and U.S. patent application Ser. No. 18/301,965 are incorporated by reference herein, in their entirety.

BACKGROUND

With the advent of multimedia streaming services, consumers have an almost unlimited quantity of content available on demand. The consumer experience has improved dramatically in terms of content search and discovery, the quality of content produced, and in the availability of client devices and applications. For example, video streaming platforms have created new user interfaces for displaying content in mobile applications, integrated television applications, and console devices. This has resulted in a previously unforeseen problem—an overabundance of content and viewing options that leaves some users overwhelmed and confused.

In addressing this problem, new user experiences have been created to focus on segmenting and surfacing content by category, user preference, and trends. Compounding the problem, new channels for advertising and promotional content have been created and sometimes even embedded within the viewing experience. Whereas advertising content in the past was static and pre-programmed, these new advertising channels perform complex operations such as real-time bidding to deliver ad content dynamically and on demand.

The sheer volume of content and optionality has created a need for automating and streamlining processes to reduce the cost and delay associated with traditionally human performed tasks. On demand media service providers, advertising exchanges, and related services have a variety of business and technical constraints that require a deeper, more contextual understanding of media content. These providers continue to employ large numbers of personnel, many of whom are tasked with tedious human analysis and review of media related content.

SUMMARY

In general, in one aspect, embodiments relate to systems and methods for multimedia scene break detection on a media item. One or more scene break timestamps can be designated for the media item. Scene breaks can then be utilized to generate a preview, media clip, or other content based on the media item for playback on a client application of an end user.

In general, in one aspect, embodiments relate to a system for multimedia scene break detection. The system can include: a computer processor, a scene break detection service executing on the computer processor and comprising functionality to: (i) receive a request for scene break detection on a media item, (ii) identify a set of candidate scene break timestamps selected based on analysis of an audio component of the media item and a video component of the media item, (iii) execute a computer vision scoring model for each candidate scene break timestamp to generate a score representing a visual distance between a first set of proximal frames and a second set of proximal frames of the candidate scene break timestamp, and (iv) select, based at least on the score of each of the set of candidate scene break timestamps, a final set of scene break timestamps for the media item.

In general, in one aspect, embodiments relate to a method for multimedia scene break detection. The method can include: (i) receiving a request for scene break detection on a media item, (ii) identifying a set of candidate scene break timestamps selected based on analysis of an audio component of the media item and a video component of the media item, (iii) executing a computer vision scoring model for each candidate scene break timestamp to generate a score representing a visual distance between a first set of proximal frames and a second set of proximal frames of the candidate scene break timestamp, and (iv) selecting, based at least on the score of each of the set of candidate scene break timestamps, a final set of scene break timestamps for the media item.

In general, in one aspect, embodiments relate to a non-transitory computer-readable storage medium having instructions for multimedia scene break detection. The instructions are configured to execute on at least one computer processor to enable the computer processor to: (i) receive a request for scene break detection on a media item, (ii) identify a set of candidate scene break timestamps selected based on analysis of an audio component of the media item and a video component of the media item, (iii) execute a computer vision scoring model for each candidate scene break timestamp to generate a score representing a visual distance between a first set of proximal frames and a second set of proximal frames of the candidate scene break timestamp, and (iv) select, based at least on the score of each of the set of candidate scene break timestamps, a final set of scene break timestamps for the media item.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

FIGS. 7A, 7B, 7C, 7D, 7E, and 7F depict examples of bipartite matching in a computer vision analysis, in accordance with one or more embodiments.

DETAILED DESCRIPTION

Figure 1A:
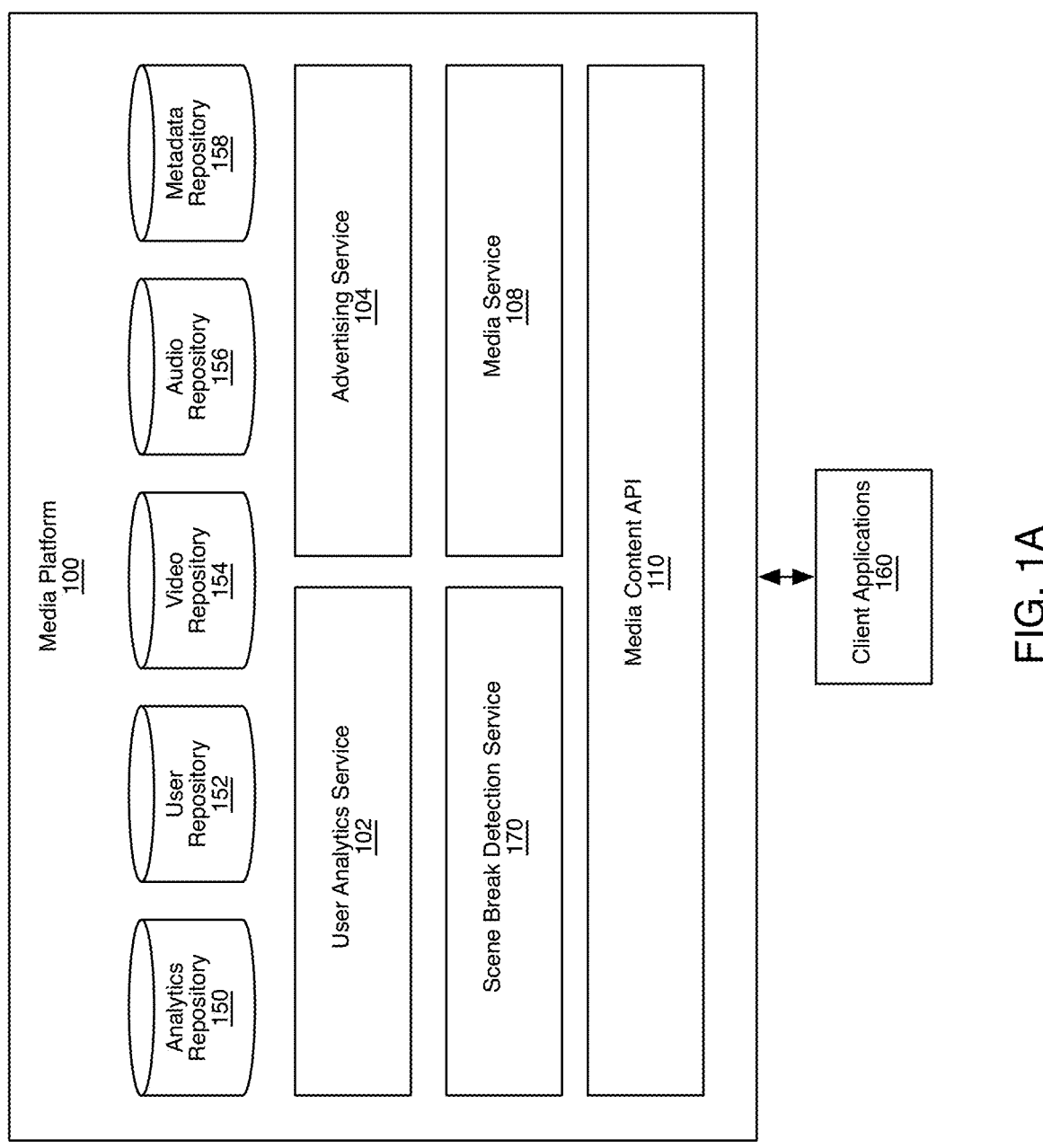
FIG. 1A shows a schematic diagram of a media system, in accordance with one or more embodiments.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It will be apparent to one of ordinary skill in the art that the invention can be practiced without these specific details. In other instances, well-known features have not been described in detail to avoid unnecessarily complicating the description.

In general, embodiments of the present disclosure provide methods and systems for performing scene break detection on a media item. Various aspects of the media item may be analyzed sequentially or in parallel to identify one or more candidate scene break timestamps. This may include, for example, analysis of an audio component, video component, and/or metadata or attribute information associated with the media item. For example, a novel computer vision analysis is performed to identify candidate scene break timestamps of a video media item. The candidate scene break timestamps are then utilized for the purpose of advertisement break injection, media preview generation, and/or advertising media clip generation, in accordance with various embodiments of the invention.

The systems and methods disclosed in the present disclosure include functionality relating to scene break detection, media preview/clip generation, and other functionality using various types of media items. For exemplary purposes, many of the foregoing systems and processes are described with video as the media type. It should be noted that these systems and processes, though often described in the context of video advertisements, can be performed on a variety of different media types and formats, including audio (music/speech/nature/scientific), digital print media (books, magazines, newspapers), television shows, movies, video games, social media posts, and any other content served to one or more audiences for which it may be desirable to perform scene break detection and/or to generate a summary, preview, or advertising-related clip.

FIG. 1A shows a media platform 100 and client applications 160 in accordance with one or more embodiments. As shown in FIG. 1A, the media platform 100 has multiple components including a scene break detection service 170, a media service 108, an advertising service 104, a user analytics service 102, a media content application programming interface (API) 110, an analytics repository 150, a user repository 152, a video repository 154, an audio repository 156, and a metadata repository 158. Various components of the messaging platform 100 can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one or more embodiments, the media platform 100 is a platform for facilitating analysis, streaming, serving, and/or generation of media-related content. For example, the media platform 100 may store or be operatively connected to services storing millions of media items such as movies, user-generated videos, music, audio books, and any other type of media content. The media content may be provided for viewing by end users of a video or audio streaming service (not shown), for example. Media services provided by the media platform 100 can include, but are not limited to, advertising media services such as advertisement media clip generation, advertisement scene break detection, and other functionality disclosed herein. Non-advertising related embodiments include media preview generation and other scene break detection applications, in accordance with various embodiments of the invention.

In one or more embodiments of the invention, the media platform 100 is a technology platform including multiple software services executing on different novel combinations of commodity and/or specialized hardware devices. The components of the media platform 100, in the non-limiting example of FIG. 1A, are software services implemented as containerized applications executing in a cloud environment. The scene break detection services and related components can be implemented using specialized hardware to enable parallelized analysis and performance. Other architectures can be utilized in accordance with the described embodiments.

In one or more embodiments of the invention, the scene break detection service 170, the media service 108, the advertising service 104, the user analytics service 102, and the media content application programming interface (API) 110 are software services or collections of software services configured to communicate both internally and externally of the media platform 100, to implement one or more of the functionalities described herein. The systems described in the present disclosure may depict communication and the exchange of information between components using directional and bidirectional lines. Neither is intended to convey exclusive directionality (or lack thereof), and in some cases components are configured to communicate despite having no such depiction in the corresponding figures. Thus, the depiction of these components is intended to be exemplary and non-limiting.

Scene Break Detection Over View

In one or more embodiments of the invention, the scene break detection service 170 includes functionality to detect one or more scene breaks in a media item. The scene break detection service 170 may be configured to perform shot detection in order to identify continuous segments of smaller visually similar frames, or may utilize each shot as a separate frame, in accordance with various embodiments of the invention. Various methods of scene break scoring are disclosed herein, including computer vision analysis and machine learning analysis. Upon completion of the scoring procedure, the scene break detection service 170 can select one or more of the final scene break timestamps according to the requested application, heuristics, criteria, and/or constraints.

In one or more embodiments of the invention, the media service 108 includes functionality to generate a media clip or preview of a media item based on one or more scene break timestamps. In this way, the media service 108 can be configured to perform dynamic content generation, and to serve dynamically generated content such as previews and clips to various client applications such as an advertising exchange, a video streaming service, an audio streaming service, and more. In one embodiment of the invention, the media service 108 utilizes human review and/or approval to improve the quality of the generated content items.

Repositories Description

In one or more embodiments of the invention, each repository (150, 152, 154, 156, 158) of the media platform 100 includes both business logic and/or storage functionality. For purposes of this disclosure, the terms "repository" and "store" may refer to a storage system, database, database management system (DBMS), or other storage related technology, including persistent or non-persistent data stores, in accordance with various embodiments of the invention.

In one or more embodiments of the invention, each repository includes both persistent and non-persistent storage systems, as well as application logic configured to enable performant storage, retrieval, and transformation of data to enable the functionality described herein. Non-persistent storage such as Redis, Memcached, and an in-memory data store can be utilized to cache data in order to increase performance of frequently accessed data and reduce the latency of requests.

In one or more embodiments of the invention, the video repository 154 includes functionality to store one or more video media items. Video media can include, but are not limited to, movies, commercials, previews, clips, user generated videos, reels, user video stories/diaries, and advertisement videos.

In one or more embodiments of the invention, the audio repository 156 includes functionality to store one or more audio media items. Examples of audio media items can include, but are not limited to, songs, audio books, voicemails, an audio component of a video media item, music, multi-language audio translations for a video media item, and any other auditory media item.

In one or more embodiments of the invention, the analytics repository 150 includes functionality to store analytics data relating to one or more media items. Media items can include media previews, media clips, and media-related advertising content. Examples of analytics data can include, but are not limited to, user engagement data relating to a media item, feedback regarding placement of an advertisement, media clip, or media preview, usage data and performance data relating to media items, and feedback utilized as online training data in the training and retraining of one or more machine learning models.

In one or more embodiments of the invention, the user repository 152 includes functionality to store data relating to one or more users. For purposes of this disclosure, in one or more embodiments, a user can refer to any user of the described systems and/or users external to the described systems. For example, an end user of a mobile application may view a streaming video and related advertisements. Other users can interface directly with one or more of the systems and processes described herein, in accordance with various embodiments of the invention. In another example, an admin user may log into a web interface (not shown) of the media platform 100 to select, modify, approve, or decline generated media clips or previews. User data stored in the user repository 152, can include but is not limited to, user demographic information, user login or activity information, user language/locale information, user device information, user browsing or activity history, user interest information, user profile information, and any other data relating directly or indirectly with a user.

In one or more embodiments of the invention, the metadata repository 158 includes functionality to store metadata associated with media items, users, advertisements, and/or analytics data. Examples of metadata can include, but are not limited to, a streaming manifest file for a video media item, a transcription or closed caption text of an audio media item, size of a media item, duration of a media item, a genre of a media item, a source identifier of a media item (e.g., a uniform resource identifier), a textual summary or description of a media item, an actor list of a media item, a staff attribution list of a media item, a screenplay of a media item, a production date of a media item, and any other information relevant to the media item.

Figure 1B:
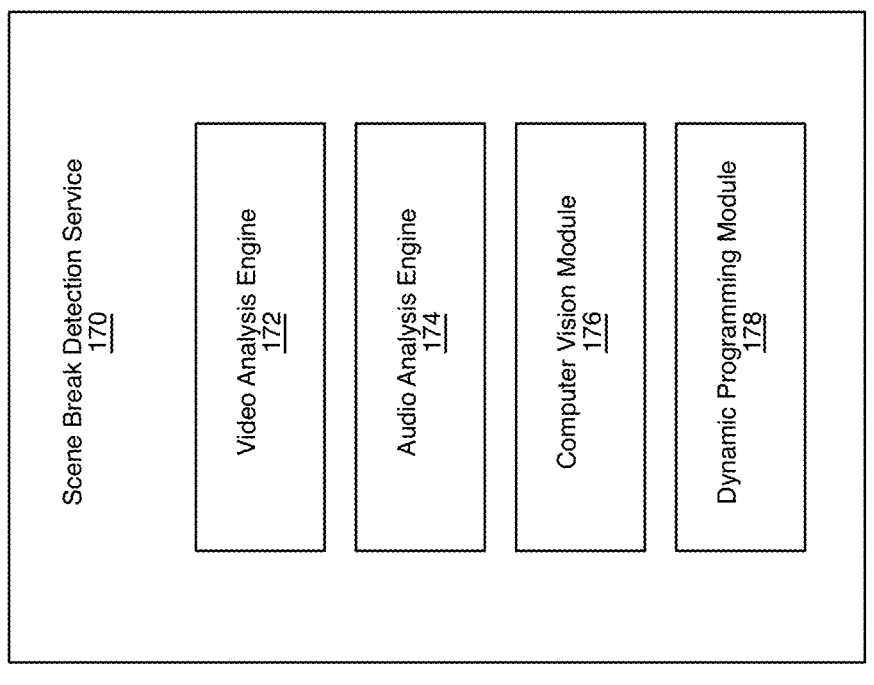
FIG. 1B shows a schematic diagram of a scene break detection service, in accordance with one or more embodiments.

FIG. 1B shows a scene break detection service 170 in accordance with one or more embodiments. As shown in FIG. 1B, the scene break detection service 170 has multiple components including a video analysis engine 172, an audio analysis engine 174, a computer vision module 176, and a dynamic programming module 178. Various components of the scene break detection service 170 can be located on the same device (e.g., a server, mainframe, virtual server in a cloud environment, and any other device) or can be located on separate devices connected by a network (e.g., a local area network (LAN), the Internet, a virtual private cloud, etc.). Those skilled in the art will appreciate that there can be more than one of each separate component running on a device, as well as any combination of these components within a given embodiment.

Audio Analysis

In one or more embodiments of the invention, the audio analysis engine 174 includes functionality to perform audio break detection on an audio media item. The audio media item can be an audio component of a video media item or a standalone audio file. In various embodiments, the audio analysis engine 174 can be configured to analyze the audio to detect human speech, music (e.g., segue music), and/or various different sounds that correlate well with either scene changes or in-scene occurrences. In one example, the audio analysis engine 174 utilizes a voice activity detection (VAD) model to identify segments of human speech in a variety of languages. The audio analysis engine 174 is configurable to use a variable threshold of time during which the VAD correlates occurrences of speech in the audio file (e.g., T seconds neighborhood).

In one or more embodiments of the invention, the audio analysis engine 174 includes functionality to output a list of ranges, each range representing an audio "scene" or related section of audio that is part of a single situation in a narrative depicted by the media item, or a continuous segment of the media item that occurs in a single stage setting. In one or more embodiments of the invention, these segments of audio can also represent continuous segments of human speech. Continuous speech, in this context, can refer to the same or any entity (e.g., an individual speaker) speaking without more than T seconds of interruption or silence (T being a predefined threshold of the model). In one example, the audio analysis engine 174 delineates between speakers in a given conversation, versus speakers in a separate unrelated conversation by correlating the speech with an audio transcription and by performing natural language processing on the transcription to similarly generate segments of related speech. In this example the audio analysis engine 174 identifies the contextual boundaries (timestamps) of the audio transcription and utilizes those boundaries as a signal in identifying audio break timestamps for the media item. In this example, audio break timestamps are only designated within a predefined time window (e.g., 1.5 seconds) of the contextual boundaries (timestamps) of the audio transcription.

Video Analysis-Shot Detection

For purposes of this disclosure, a video shot (or a "shot" in the context of video) can refer to one or more contiguous frames of a video, optionally grouped according to visual similarity. In one embodiment, a shot is a short segment of a video (typically no longer than a few seconds) which is programmatically detected based on a frame-by-frame comparison of the video. In another embodiment, a shot can refer to a single frame of the video with no grouping of frames required.

For purposes of this disclosure, a scene can refer to a grouping of shots based on something more than a simple frame-by-frame analysis. In one embodiment, a scene refers to a segment of the media file that depicts a division of an act presenting continuous action in one place, a single situation in a narrative depicted by the media item, or a continuous segment of the media item that occurs in a single stage setting. A scene can (and typically does) span one or more shots. In one embodiment of the invention, the detection of a scene involves aggregate analysis of a grouping of shots rather than just a shot-by-shot analysis. Thus, for example, even if a transition occurs from shot A to shot B at a given timestamp of the media item, it may be determined that when analyzed in conjunction with shots preceding and succeeding shots A and B, that both shots A and B fall within a single scene of the media item.

In one or more embodiments of the invention, the video analysis engine 172 includes functionality to perform shot detection on a video media item. The video media item can be a standalone video item or a video component of a media item containing audio and video. The scene break detection service 170 can be configured to identify shot boundaries within the video according to any number of pre and post-filtering criteria. For example, the scene break detection service 170 can be configured to limit shot detection to the first ten minutes of the media item, or to exclude the final 10 minutes of the audio item.

In one or more embodiments of the invention, timestamps generated by the various components of the scene break detection service 170 can include start and end tags, or can otherwise include ranges of time which should be excluded. For example, the scene break detection service 170 can be configured to identify segments of a media item that include no shots or scenes or should be excluded entirely from scene/shot detection.

In one or more embodiments of the invention, the video analysis engine 172 includes functionality to identify shots in the media item by grouping continuous sets of video frames by visual similarity. In one embodiment, the video analysis engine 172 can be configured to designate one or more segments of the video as non-shot segments. For example, segments of the video that contain a black screen or significant amount of text on the display (e.g., a rolling credits segment) may be excluded from included in an identified shot. In one embodiment of the invention, cut detection models are utilized to designate shot boundaries. In other embodiments, additional boundary detection models and systems are utilized to ensure that shot detection accuracy is improved and that all media types and genres are accommodated by the video analysis engine 172. The problem of shot transition detection, in contrast to scene detection, is limited to narrower segments of duration and, in one embodiment, involves frame-to-frame comparison rather than multi-frame analysis. In another embodiment of the invention, both shot break analysis and scene break analysis involve multi-frame comparison operations, but shot analysis utilizes embeddings representing continuous sets of individual frames whereas scene break analysis involves analysis of shot-level embeddings.

Streaming Manifest

In one or more embodiments of the invention, the video analysis engine 172 includes functionality to identify a set of segment boundaries in a streaming manifest of a media item. In one embodiment of the invention, each streaming segment represents a timestamp/frame at which audio and video synchronization occurs and at which any splicing, division (e.g., media clips), or interruption of the media playback should occur (e.g., advertisements). In one embodiment, streaming segment boundaries are points in time at which a media application (e.g., a streaming video application) can start playing the media file. In this embodiment, if an advertisement break or other interruption occurs at a timestamp that is not close to a segment boundary, the media playback will resume such that the user would see a part of the media twice.

In one or more embodiments of the invention, the scene break detection service 170 includes functionality to identify the streaming segment boundaries and to perform one or more modifications to shot breaks accordingly. In one example, the scene break detection service 170 is configured to filter out shots that have a shot boundary outside of a predefined distance (time) of a streaming segment boundary. The predefined distance can be received by the scene break detection service 170 as an input or runtime configuration parameter. In one embodiment, video streaming boundaries are different from shot boundaries and come from video engineering during the transcoding of the media file.

Streaming segment filtering can be performed by the scene break detection service 170 on candidate audio break segments, candidate shot timestamps, and/or candidate scene breaks. Thus, the process can be performed at various points of the analysis of a media item, in accordance with various embodiments of the invention.

Scene Break Detection

In one or more embodiments of the invention, the scene break detection service 170 includes functionality to perform scene break detection on a media item. The scene break detection service 170 can be configured to perform one or more methods of scene break detection, in accordance with various embodiments of the invention. For example, the computer vision module 176 can perform a computer vision analysis of one or more media items in order to identify scenes and corresponding scene break timestamps.

In one or more embodiments of the invention, the scene break detection service 170 includes functionality to receive a request for scene break detection on a media item. The request can include an identifier of the media item, a set of constraints on the scene break detection, an identifier of a user associated with the request, an identifier of a container in which the media item is to be displayed, metadata associated with the media item, and/or a type of action for which the scene break detection is intended in accordance with various embodiments. If a user identifier is included, in one embodiment, the scene break detection service 170 can be configured to personalize both the scene break detection and the resulting media clip, media preview, or advertisement generated based on the scene break timestamps. In one example, user language or locale can be used to personalize the resulting media (e.g., via audio translation). In another example, the scene break detection service 170 is configured to modify the duration and/or frequency of the generated media. In this example, the user may specify via a profile setting that they prefer to receive long-form movie or media previews. The scene break detection service 170 then specifies a duration range for the resulting media preview according to the user profile setting. In another example, the user can select a profile setting for longer, less frequent advertising content versus a profile setting for shorter, more frequent advertising content. The scene break detection service 170 then specifies a duration range for the duration of scenes detected for the purpose of advertisement breaks according to the user's profile setting.

In one or more embodiments of the invention, the scene break detection service 170 includes functionality to identify a set of candidate ad break timestamps corresponding to instances of a set of the audio break timestamps and a set of video break timestamps within a predefined proximity. In one embodiment, the set of audio break timestamps are obtained from the audio analysis engine 174 and the set of video break timestamps are obtained from the video analysis engine 172 via the processes described herein (e.g., audio break detection, shot detection).

Figure 3:
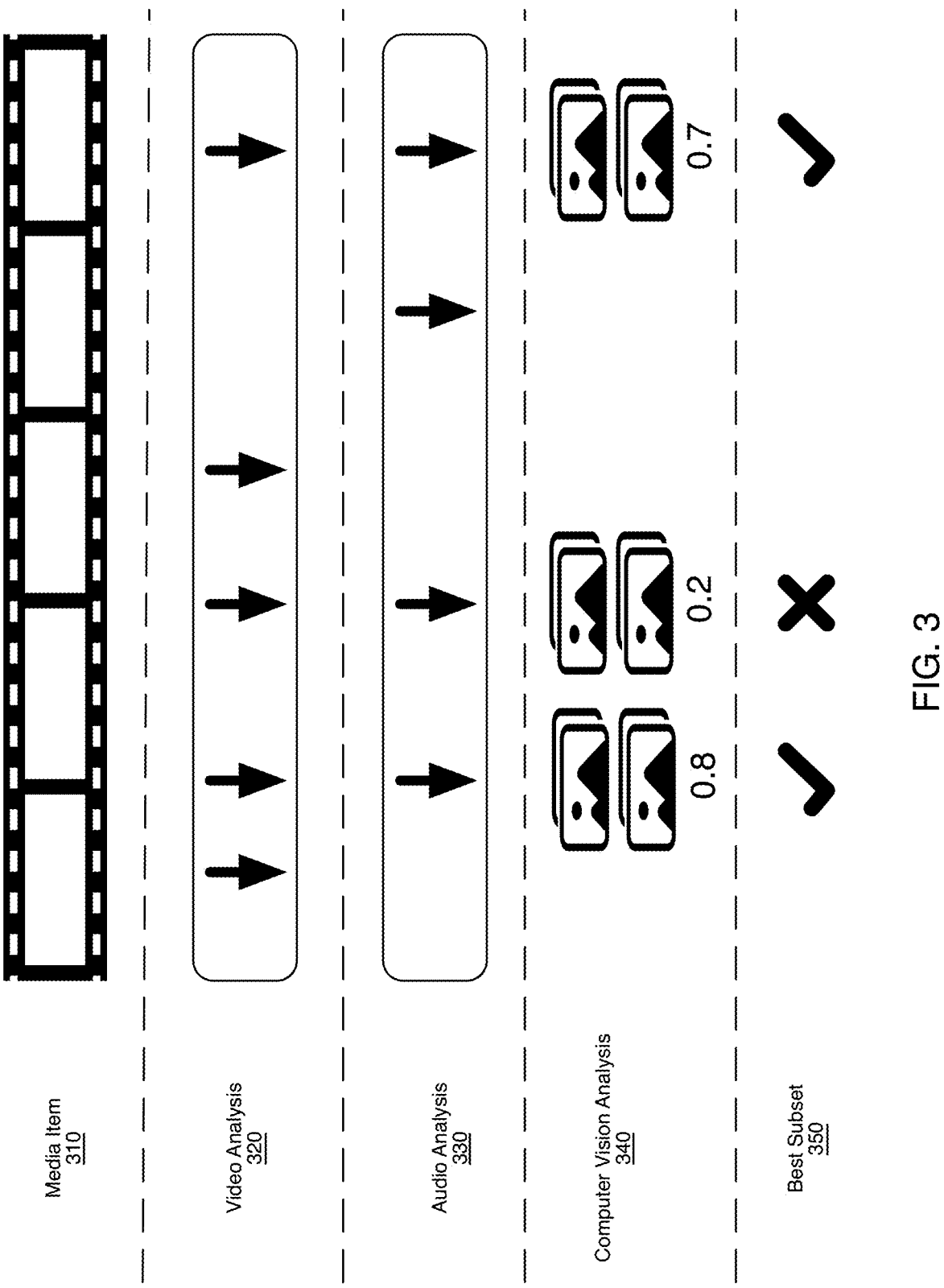

FIG. 3 at least partly describes a process for identifying video shot boundaries and audio break boundaries that fall within a predefined proximity. The predefined proximity can be fixed or variable, in accordance with various embodiments of the invention. For example, a fixed predefined proximity can be set at 500 milliseconds. In another example, the scene break detection service 170 can be configured to use a variable proximity. In this example, the proximity is adjusted to produce the desired number of breaks per duration of time. Thus, if there are very few video and audio break times per minute of media, the predefined proximity is increased accordingly to produce the desired number of candidate scene breaks. Continuing the example, if the number of video and audio break timestamps per minute of media is high, the predefined proximity is reduced to once again produce the desired number of candidate scene breaks (or to produce a number that falls within a desired range per unit of time).

Computer Vision Analysis

In one or more embodiments of the invention, the scene break detection service 170 includes functionality to perform a computer vision analysis on a media item. Computer vision analysis can comprise one or more processes for performing scene break detection using a set of multiple candidate shots both preceding and succeeding a given timestamp.

For purposes of this disclosure, the terms "computer vision scoring model" and "computer vision model" can refer to a set of business logic residing in one or more applications and configured to execute a computer vision scoring process. The computer vision model may optionally be implemented as a machine learning model configured to infer or otherwise determine a score for each of a set of shot boundaries of a media item. In other embodiments of the invention, the computer vision model is not a machine learning model, but is configured to utilize other methods such as bipartite matching and dynamic programming to generate one or more scene break scores and/or to select one or more scene breaks for a media item.

Machine Learning CV

In one or more embodiments of the invention, the scene break detection service 170 includes functionality to deploy and execute a machine learning model for executing computer vision analysis. The machine learning model is a supervised model generated and trained using a labeled dataset of examples. The dataset can be obtained from publicly available media sources comprising a media file and tagged advertisement timestamps. In one example, the scene break detection service 170 includes functionality to obtain the training dataset from cable television, other media streaming platforms, and a variety of available sources of media content comprising advertisements. These media ads can then be labeled by one or more human administrators and provided to a machine learning training module (not shown) for initial training and/or online training of the model.

After deployment of the machine learning model, online training can further be performed either programmatically or initiated by a manual process. The feedback loop can involve a user-generated feedback option (e.g., "Was this advertisement placed at an appropriate time?") or may involve analysis of metrics such as retention rate. In one embodiment of the invention, the scene break detection service 170 includes functionality to calculate a retention rate of a given advertisement displayed at a selected scene break timestamp. To account for differences that may result from the advertisement content rather than the scene break time, a score may be generated to indicate whether the scene break performed better or worse than other scene breaks for the same advertisement. This score can then be utilized as a label to train or retrain the model to optimize for retention. It is noteworthy that optimizing for user perception of the quality of the scene break may result in greatly different results than optimizing for retention. For example, retention may be increased by selecting scene breaks that interrupt a climactic portion of the media item, whereas user perception of such an interruption may be negative. In order to account for these disparities, the machine learning model may be implemented as a multi-target model capable of optimizing for both viewer perception, retention, and/or administrator ratings.

Feature Generation

In one or more embodiments of the invention, the computer vision module 176 includes functionality to generate a set of feature vectors representing one or more shots of the media item. In one example, the computer vision module 176 generates a feature vector or embedding for each of a set of candidate shots. In this example, if the shot consists of more than one frame, a single representative frame is selected for analysis. There are many options to featurize or embed a frame (or image). Examples of processes for generating the feature vector include but are not limited to, histogram of colors, Dense Scale Invariant Feature Transform (SIFT), and any variety of deep learning models. In one example, ResNet50, a convolutional neural network, is utilized to generate the vector. The output of ResNet50 is a vector of numbers with the length of 2048. Thus, in this example, we represent each shot with 2048 values. Here is an exemplary reproduction of such a vector:

[0.0, 0.32, 0.87, 0.96, 0.16, 0.29, 0.50, 0.01, 0.05, 0.35, 0.13, 0.05, 0.00, 0.20, 1.32, 0.80, 1.05, 0.85, 0.18, 0.18, 0.64, 0.03, 0.30, 0.20, 0.57, 0.08, 0.56, 0.0, 0.15, 0.11, 0.12, 0.89, 0.17, 0.04, 0.73, 0.15, 1.68, 0.54, 0.36, 0.03, 0.38, 0.70, 0.04, 0.09, 0.04, 0.94, 0.41, 0.06, 0.12, 0.44, 0.23, 0.06, 0.37, 0.11, 0.26, 0.01, 0.25, 0.11, 0.48, 0.21, 0.19, 0.16, 0.39, 0.44, 0.03, 0.35, 0.00, 0.00, 0.05, 0.47, 0.09, 0.26, 0.92, 0.01, 0.32, 0.31, 0.45, 1.30, 0.04, 0.03, 0.05, 0.09, 0.12, 0.92, 0.19, 0.54, 1.93, 0.18, 0.01, 0.98, 0.25, 0.42, 1.23, 0.09, 0.88, 0.32, 0.82, 0.17, 0.00, 1.05, 0.15, 0.06, 0.37, 0.29, 0.04, 0.02, 0.20, 0.11, 0.10, 0.23, 0.09, 1.04, 0.27, 0.04, 0.02, 0.08, 0.10, 0.09, 0.27, 1.14, 0.17, 0.0, 0.02, 0.06, 1.09, 0.46, 0.05, 0.04, 0.06, 0.25, 0.76, 0.43, 0.04, 0.44, 0.07, 0.72, 0.21, 0.58, 0.11, 0.10, 0.12, 0.49, 1.61, 0.68, 0.14, 0.05, 0.20, 0.23, 0.02, 0.40, 0.28, 0.00, 0.16, 0.54, 0.28, 0.21, 0.43, 0.01, 0.07, 0.31, 0.13, 0.72, 0.09, 0.07,
0.64, 1.03, 0.64, 0.14, 0.82, 0.19, 1.15, 1.93, 0.06, 0.30, 0.22,
0.0, 1.82, 0.23, 0.15, 0.10, 0.76, 0.05, 0.39, 3.58, 0.22, 0.32,
0.00, 0.43, 0.06, 0.13, 0.24, 0.87, 0.16, 0.08, 0.0, 0.13, 0.15,
0.18, 0.17, 0.33, 0.10, 0.53, 0.22, 0.42, 1.27, 0.15, 0.30, 0.06,
0.33, 0.79, 0.33, 0.05, 0.40, 0.36, 0.03, 0.20, 0.02, 0.11, 0.19,
0.01, 0.48, 1.25, 0.11, 0.34, 0.78, 0.28, 0.13, 0.36, 0.42, 0.29,
0.75, 0.27, 0.21, 0.30, 0.03, 0.04, 0.21, 1.05, 0.27, 0.00, 0.74,
0.45, 0.20, 0.32, 0.04, 0.75, 0.04, 0.46, 0.30, 0.11, 1.14, 0.13,
0.54, 0.00, 0.34, 0.21, 0.23, 0.00, 0.33, 0.10, 0.00, 0.15, 0.48,
0.06, 0.00, 1.19, 0.03, 0.75, 0.45, 0.02, 0.05, 0.07, 1.91, 1.87,
0.07, 0.02, 0.23, 0.37, 0.13, 0.60, 0.25, 0.04, 0.15, 0.20, 0.10,
0.85, 0.22, 0.39, 0.66, 0.22, 0.09, 0.00, 0.05, 0.21, 0.00, 0.05,
0.78, 0.01, 1.25, 0.07, 0.50, 1.34, 0.23, 0.48, 0.23, 0.48, 0.00,
0.05, 0.23, 0.14, 0.03, 0.18, 0.08, 0.10, 0.08, 0.37, 0.29, 0.06,
0.50, 0.41, 0.06, 0.83, 1.04, 0.20, 0.01, 0.19, 0.11, 0.19, 0.23,
0.41, 0.18, 0.37, 0.01, 0.35, 0.17, 0.08, 0.04, 0.04, 0.06, 0.20,
0.01, 0.01, 0.28, 0.09, 0.09, 0.54, 1.40, 0.21, 0.24, 0.05, 0.05,
0.15, 0.16, 0.01, 0.00, 0.25, 0.10, 0.15, 0.19, 0.13, 0.17, 0.08,
0.07, 0.56, 0.51, 0.17, 0.09, 0.03, 0.16, 0.60, 0.08, 0.06, 0.20,
0.01, 0.50, 0.04, 0.80, 0.76, 0.02, 0.07, 0.31, 0.14, 0.25, 0.05,
0.07, 0.22, 0.02, 0.36, 0.64, 0.40, 1.16, 0.31, 0.54, 0.00, 0.10,
0.36, 0.25, 0.47, 0.09, 0.16, 0.34, 0.02, 0.16, 0.12, 0.14, 0.40,
0.18, 0.00, 0.41, 0.63, 0.07, 0.55, 0.05, 0.88, 0.11, 0.31, 0.23,
0.06, 0.28, 0.06, 0.25, 0.21, 0.05, 0.22, 0.07, 0.19, 0.01, 0.19,
0.15, 0.07, 0.15, 1.28, 0.08, 0.19, 0.15, 0.01, 0.38, 0.28, 0.13,
0.22, 0.12, 0.55, 0.13, 0.16, 0.37, 0.22, 0.12, 0.10, 0.52, 0.02,
0.02, 0.27, 0.92, 0.14, 0.04, 0.56, 0.06, 0.24, 0.18, 0.64, 0.15,
0.10, 0.23, 0.02, 0.00, 0.04, 0.67, 0.07, 0.22, 1.88, 0.09, 0.00,
0.16, 0.41, 0.11, 0.14, 0.87, 0.06, 1.01, 1.02, 0.14, 0.02, 0.32,
0.35, 0.00, 0.15, 0.03, 0.43, 0.21, 0.23, 1.82, 0.11, 0.06, 0.07,
0.31, 0.52, 0.37, 0.16, 0.79, 0.08, 0.44, 0.05, 0.37, 0.61, 0.13,
0.04, 0.02, 0.67, 0.60, 0.06, 0.54, 0.01, 0.22, 0.06, 0.03, 0.46,
0.01, 0.00, 0.22, 1.32, 0.24, 0.03, 0.20, 0.51, 0.24, 0.13, 0.19,
0.46, 0.07, 0.17, 0.10, 0.19, 0.13, 0.18, 0.30, 0.22, 0.12, 0.90,
0.39, 0.18, 0.87, 0.49, 0.24, 0.10, 0.09, 0.52, 0.27, 1.14, 0.95,
0.24, 0.13, 0.06, 0.42, 0.85, 0.29, 0.14, 0.24, 0.34, 0.17, 0.88,
0.40, 0.00, 0.24, 0.46, 0.95, 0.24, 0.36, 0.12, 0.18, 0.35, 0.98,
0.92, 0.10, 0.24, 0.06, 0.09, 0.73, 0.14, 0.01, 0.57, 0.10, 0.13,
0.08, 0.20, 0.24, 0.47, 0.15, 0.28, 0.15, 1.14, 0.10, 0.28, 0.94,
0.11, 0.25, 0.09, 0.06, 0.40, 0.53, 0.42, 0.38, 0.04, 0.06, 0.22,
0.19, 0.05, 0.12, 0.31, 0.05, 0.07, 0.03, 0.27, 0.02, 0.04, 0.39,
0.60, 0.65, 0.11, 0.11, 0.00, 0.04, 0.01, 1.31, 0.41, 0.11, 0.36,
0.12, 0.34, 0.38, 0.23, 0.03, 1.57, 0.20, 1.35, 1.08, 0.02, 0.54,
0.48, 0.25, 0.23, 0.26, 1.18, 0.82, 0.28, 1.17, 0.15, 0.55, 0.01,
0.08, 0.23, 0.05, 0.04, 0.12, 0.06, 1.31, 0.99, 1.17, 0.61, 0.30,
0.61, 0.11, 0.23, 0.05, 0.15, 0.72, 0.08, 2.27, 0.13, 1.91, 0.06,
0.11, 0.57, 0.27, 0.08, 0.40, 0.25, 0.06, 1.47, 0.36, 0.0, 0.13,
0.85, 0.21, 0.37, 0.05, 0.05, 0.53, 0.98, 0.13, 0.47, 0.48, 0.12,
0.07, 0.36, 0.64, 0.64, 0.04, 0.07, 0.04, 0.01, 0.10, 0.01, 0.33,
0.04, 0.08, 0.19, 0.46, 0.40, 0.20, 0.08, 0.41, 0.81, 0.82, 0.25,
0.49, 0.02, 0.19, 0.20, 0.19, 0.01, 0.20, 1.28, 0.00, 0.24, 0.05,
0.33, 0.18, 0.15, 0.27, 0.74, 0.00, 0.00, 0.08, 0.06, 0.33, 0.27,
0.04, 0.07, 0.23, 0.17, 0.31, 0.95, 0.16, 0.17, 0.29, 0.02, 0.55,
0.15, 0.43, 0.44, 0.18, 0.61, 0.06, 0.20, 0.06, 0.00, 0.04, 0.35,
0.21, 0.22, 0.05, 0.16, 0.19, 0.09, 0.30, 0.27, 0.90, 0.70, 0.40,
0.18, 0.70, 0.26, 0.36, 0.27, 0.22, 0.08, 0.08, 0.30, 0.34, 0.36,
0.73, 0.38, 0.74, 0.12, 0.63, 0.27, 0.00, 0.61, 0.10, 0.02, 0.80,
0.22, 0.07, 0.07, 0.03, 0.28, 0.21, 1.54, 0.05, 0.20, 0.33, 0.01,
0.53, 0.35, 0.06, 0.09, 0.20, 0.16, 0.05, 1.02, 0.00, 0.22, 0.16,
0.07, 0.00, 0.52, 0.07, 0.11, 0.04, 0.25, 0.66, 0.17, 0.41, 0.02,
0.06, 0.22, 0.08, 0.02, 0.98, 0.16, 0.14, 0.16, 0.29, 0.44, 0.35,
0.30, 0.02, 0.16, 0.04, 0.11, 0.18, 0.05, 1.38, 0.01, 0.42, 0.26,
0.49, 0.06, 0.15, 0.79, 0.09, 0.41, 0.02, 0.26, 0.07, 0.12, 0.48,
0.23, 0.17, 0.10, 0.10, 0.07, 0.02, 0.04, 0.68, 0.10, 0.01, 0.09,
0.86, 0.22, 0.10, 0.10, 0.16, 0.13, 0.46, 0.58, 0.42, 0.64, 0.66,
1.01, 0.07, 0.26, 1.45, 0.0, 0.12, 0.42, 1.12, 0.12, 0.08, 0.56, 0.20, 0.13, 1.02, 0.88, 0.32, 0.90, 0.42, 0.16, 0.30, 0.45, 0.14,
0.11, 0.10, 0.79, 0.10, 0.07, 0.28, 0.25, 0.09, 1.64, 0.70, 0.69,
0.13, 0.56, 0.13, 0.22, 0.10, 0.56, 1.21, 0.29, 0.04, 0.22, 0.23,
0.11, 0.66, 0.0, 0.11, 0.03, 0.23, 0.27, 0.16, 0.46, 0.00, 0.25,
0.10, 0.35, 0.13, 0.17, 0.25, 0.17, 0.11, 0.32, 0.03, 0.21, 0.54,
1.19, 0.13, 0.28, 1.14, 0.10, 0.29, 0.34, 0.02, 0.04, 0.01, 0.13,
0.14, 0.46, 0.01, 0.04, 0.50, 0.42, 0.36, 0.39, 0.17, 0.41, 0.01,
0.02, 0.10, 0.44, 0.89, 0.36, 0.82, 0.49, 0.84, 0.03, 0.34, 0.28,
0.03, 0.39, 0.11, 0.09, 0.23, 0.02, 0.55, 0.00, 0.05, 0.25, 0.23,
1.78, 0.52, 0.63, 0.35, 0.04, 0.11, 0.00, 0.18, 0.99, 0.01, 0.24,
0.47, 0.32, 0.39, 0.63, 0.65, 0.04, 0.04, 0.26, 0.22, 0.46, 0.02,
0.59, 0.17, 0.14, 0.31, 0.51, 1.21, 0.07, 0.16, 0.26, 0.55, 0.62,
0.07, 0.18, 0.23, 0.05, 0.48, 0.84, 0.09, 0.41, 0.19, 0.17, 0.07,
0.08, 0.29, 0.30, 0.32, 0.03, 0.33, 0.22, 0.04, 0.11, 0.54, 0.54,
0.38, 1.83, 0.11, 0.39, 0.23, 0.25, 0.02, 2.12, 0.24, 0.01, 0.37,
0.38, 0.24, 0.40, 0.17, 0.21, 0.66, 1.21, 0.38, 0.27, 3.91, 0.28,
0.06, 0.28, 0.37, 0.02, 0.17, 0.24, 0.17, 0.49, 0.20, 0.78, 0.10,
1.43, 0.00, 0.0, 0.16, 0.61, 0.06, 0.42, 1.00, 0.13, 0.56, 0.31,
0.04, 0.78, 0.27, 0.49, 0.25, 0.54, 0.04, 0.12, 0.26, 0.06, 0.54,
0.31, 0.24, 0.59, 0.32, 0.54, 0.06, 0.52, 0.14, 0.28, 0.65, 0.38,
0.95, 0.44, 0.21, 0.19, 0.06, 0.06, 0.00, 0.05, 1.50, 0.48, 0.03,
0.17, 0.46, 0.76, 0.29, 0.01, 0.04, 0.86, 0.01, 0.00, 0.57, 0.16,
0.01, 0.15, 0.12, 0.22, 0.39, 0.15, 0.26, 0.04, 0.00, 0.31, 0.08,
0.15, 0.00, 0.28, 2.17, 0.14, 0.32, 0.86, 0.19, 0.04, 0.24, 0.86,
0.34, 0.24, 0.13, 0.35, 0.20, 0.13, 0.77, 0.15, 0.41, 0.12, 0.63,
0.11, 0.07, 0.13, 0.26, 0.11, 0.21, 0.53, 0.07, 0.36, 0.13, 1.08,
0.06, 0.06, 0.05, 0.03, 0.41, 0.16, 0.19, 0.17, 0.02, 0.68, 0.28,
1.56, 0.12, 1.14, 0.24, 0.04, 0.28, 0.12, 0.68, 0.01, 1.17, 0.03,
0.75, 0.45, 0.85, 1.81, 0.02, 0.19, 0.05, 0.22, 0.72, 0.38, 0.51,
0.08, 0.80, 1.24, 0.14, 0.04, 0.13, 0.13, 0.19, 0.13, 0.00, 1.82,
0.06, 0.51, 0.15, 0.12, 0.07, 0.26, 0.09, 1.36, 0.46, 0.53, 0.23,
1.19, 0.04, 0.08, 0.02, 0.22, 0.18, 0.01, 0.11, 0.06, 0.16, 0.05,
0.69, 0.21, 0.49, 0.71, 0.27, 0.32, 0.21, 0.32, 0.49, 0.81, 0.20,
0.36, 0.12, 0.09, 0.01, 0.79, 0.15, 0.13, 0.33, 0.01, 0.33, 0.03,
0.00, 0.82, 0.88, 0.16, 0.17, 0.32, 0.16, 0.14, 0.38, 0.00, 0.03,
0.01, 0.10, 0.46, 0.06, 0.38, 0.40, 0.21, 0.05, 0.05, 1.09, 0.57,
0.21, 0.40, 0.01, 0.13, 0.21, 1.60, 0.28, 0.14, 0.19, 0.24, 0.47,
0.09, 0.15, 0.10, 0.02, 0.43, 0.11, 0.18, 0.00, 0.03, 0.02, 0.00,
0.31, 0.63, 0.91, 0.01, 0.32, 0.14, 0.03, 0.10, 0.18, 0.02, 0.24,
0.26, 0.45, 0.33, 0.26, 0.04, 0.38, 0.26, 0.35, 0.22, 1.11, 0.11,
0.15, 0.64, 0.47, 0.16, 1.37, 0.45, 0.02, 0.03, 0.05, 0.19, 2.48,
0.65, 0.18, 0.39, 0.00, 0.20, 0.23, 0.06, 1.07, 0.19, 0.10, 0.10,
0.02, 0.03, 0.41, 0.29, 0.05, 0.37, 0.15, 0.19, 0.45, 0.53, 0.31,
0.00, 0.45, 0.59, 0.06, 0.49, 0.37, 0.62, 0.05, 0.52, 0.30, 0.16,
0.35, 0.10, 0.17, 0.68, 0.58, 0.02, 0.36, 0.76, 0.34, 0.11, 1.37,
0.94, 0.12, 0.29, 0.31, 0.00, 0.47, 0.02, 0.00, 0.21, 0.50, 0.43,
0.22, 0.07, 0.00, 0.20, 0.30, 0.07, 0.24, 1.78, 0.72, 0.05, 0.05,
0.23, 0.0, 0.27, 0.05, 0.14, 0.03, 0.11, 0.53, 0.03, 0.02, 0.03,
0.23, 0.0, 0.10, 0.93, 0.41, 0.25, 0.49, 0.35, 0.24, 0.20, 0.09,
1.09, 0.14, 0.39, 0.07, 0.80, 0.07, 0.17, 0.18, 0.33, 0.18, 0.04,
0.13, 0.29, 0.04, 0.08, 0.16, 0.01, 0.00, 0.28, 0.51, 0.23, 0.25,
0.11, 0.33, 0.48, 0.06, 0.01, 0.88, 0.04, 0.28, 0.98, 0.03, 0.40,
0.58, 0.00, 0.20, 0.09, 0.39, 0.36, 0.07, 0.91, 0.32, 0.52, 0.11,
0.05, 0.12, 0.22, 1.02, 0.41, 0.42, 0.34, 0.30, 0.86, 0.02, 0.24,
0.29, 0.24, 0.06, 0.18, 0.06, 0.05, 0.13, 1.16, 0.02, 0.14, 0.12,
0.79, 0.69, 0.26, 0.29, 0.04, 0.03, 0.15, 0.00, 0.37, 0.29, 0.09,
0.38, 0.00, 0.91, 0.16, 0.37, 0.05, 0.39, 0.12, 0.06, 0.18, 0.02,
0.05, 1.00, 0.23, 0.09, 0.13, 0.01, 1.04, 0.14, 0.87, 0.25, 0.15,
0.13, 0.28, 0.28, 0.70, 0.91, 0.0, 0.32, 0.29, 0.07, 0.36, 0.00,
0.02, 0.51, 0.02, 0.16, 0.86, 0.05, 0.36, 0.09, 0.79, 0.07, 0.85,
0.06, 0.12, 0.01, 0.44, 0.15, 0.01, 1.35, 0.92, 0.12, 0.06, 0.01,
0.80, 0.16, 0.25, 0.58, 0.01, 0.06, 0.32, 0.28, 0.03, 0.82, 0.52,
0.03, 0.40, 0.86, 0.03, 0.48, 0.76, 0.03, 0.10, 0.11, 0.05, 0.02,
0.06, 0.07, 0.18, 0.49, 0.11, 0.97, 0.21, 0.75, 0.17, 0.21, 0.13,
0.68, 0.22, 0.00, 0.02, 0.09, 0.11, 0.23, 0.37, 0.05, 0.13, 0.09,
0.08, 0.47, 0.37, 0.34, 0.07, 0.05, 0.25, 0.39, 1.13, 1.05, 0.60,
0.68, 1.47, 0.35, 0.31, 0.81, 0.65, 0.55, 0.28, 0.10, 0.46, 0.26, 0.54, 0.52, 0.07, 0.01, 0.13, 0.58, 0.08, 0.53, 0.05, 1.61, 0.00, 0.43, 0.24, 0.05, 0.11, 1.21, 0.53, 0.50, 0.24, 0.01, 0.09, 0.07, 0.41, 0.04, 0.25, 0.18, 0.20, 0.23, 0.00, 0.14, 0.12, 0.13, 0.05, 0.08, 0.11, 1.58, 0.45, 0.35, 0.19, 0.04, 0.31, 0.34, 0.11, 0.15, 0.35, 0.01, 0.12, 0.30, 0.71, 0.03, 0.25, 0.89, 0.24, 0.58, 1.22, 0.25, 1.17, 0.15, 0.51, 0.08, 2.04, 0.15, 0.54, 0.00, 0.08, 0.05, 0.00, 0.33, 0.54, 0.93, 0.22, 0.32, 0.16, 0.00, 0.28, 0.00, 0.08, 0.38, 0.44, 0.00, 0.00, 0.85, 0.09, 0.41, 0.01, 0.05, 0.18, 0.01, 0.25, 0.21, 0.77, 0.31, 0.08, 0.05, 0.09, 0.04, 0.48, 0.42, 0.20, 0.52, 0.15, 0.33, 0.39, 1.28, 0.78, 0.32, 0.15, 0.14, 0.15, 0.09, 0.17, 0.12, 0.13, 0.10, 0.55, 0.06, 0.20, 0.18, 0.52, 0.24, 0.42, 0.32, 0.47, 0.48, 0.05, 0.05, 0.00, 0.32, 0.26, 0.28, 0.32, 0.20, 0.02, 0.82, 0.07, 0.07, 0.01, 0.10, 0.14, 0.00, 0.49, 0.23, 0.30, 0.30, 0.40, 0.12, 0.01, 0.05, 0.12, 0.39, 0.15, 0.14, 0.00, 0.18, 0.46, 0.15, 0.10, 1.04, 0.05, 0.00, 0.10, 0.26, 0.62, 0.09, 0.52, 0.30, 0.00, 0.70, 0.33, 0.17, 0.18, 0.04, 0.30, 0.27, 1.18, 0.20, 0.36, 0.66, 0.89, 0.05, 0.08, 0.53, 0.88, 0.66, 0.38, 0.37, 0.19, 0.03, 0.08, 0.14, 0.00, 0.17, 0.04, 0.18, 0.40, 0.11, 0.01, 0.53, 1.04, 0.13, 0.03, 0.16, 0.01, 0.09, 0.13, 0.02, 0.08, 0.15, 0.46, 0.99, 0.41, 0.09, 2.18, 0.18, 0.33, 0.03, 0.10, 0.10, 0.04, 0.55, 0.05, 0.81, 0.10, 0.11, 1.05, 0.28, 0.07, 0.53, 0.03, 0.01, 0.63, 0.18, 0.04, 0.02, 0.05, 0.05, 0.84, 0.15, 0.90, 0.10, 0.03, 0.30, 0.50, 0.30, 0.50, 0.10, 0.02, 0.01, 0.87, 0.05, 0.16, 0.12, 0.47, 0.56, 0.18, 0.16, 0.40, 0.00, 0.86, 0.32, 0.52, 0.16, 0.08, 0.39, 0.20, 0.49, 0.48, 0.22, 0.40, 0.12, 1.15, 0.54, 0.07, 0.31, 0.28, 0.04, 1.07, 0.03, 0.02, 0.10, 0.15, 0.11, 1.44, 0.33, 0.24, 0.07, 1.21, 0.06, 0.19, 0.12, 0.09, 0.63, 0.10, 0.01, 0.73, 0.68, 0.83, 0.00, 0.26, 0.16, 0.03, 0.32, 0.32, 0.16, 0.39, 0.13, 0.30, 0.39, 0.01, 1.40, 0.07, 0.19, 0.43, 0.33, 0.05, 0.27, 0.12, 0.21, 0.09, 0.16, 0.46, 0.03, 0.61, 0.05, 0.25, 0.19, 0.34, 0.21, 0.30, 0.06, 0.05, 0.03, 0.44, 0.20, 0.03, 0.04, 0.16, 0.51, 0.22, 0.10, 0.32, 0.07, 0.35, 0.29, 0.40, 0.61, 0.22, 0.11, 0.37, 0.10, 0.16, 0.11, 0.25, 0.24, 0.05, 0.28, 0.19, 0.83, 0.38, 0.37, 0.24, 0.03, 0.34, 0.57, 0.10, 0.09, 0.94, 0.10, 0.13, 0.11, 0.0, 0.75, 0.15, 0.23, 0.24, 0.09, 0.02, 0.28, 0.25, 0.03, 0.02, 0.15, 0.23, 1.58, 0.72, 0.79, 0.07, 0.66, 0.01, 0.05, 0.22, 1.47, 0.11, 0.02, 0.06, 0.10, 0.27, 0.13, 0.37, 0.13, 1.06, 0.06, 0.19, 0.23, 0.07, 0.30, 0.39, 0.21, 0.12, 0.34, 0.11, 0.04, 0.13, 0.05, 0.68, 0.63, 0.12, 0.39, 0.07, 0.01, 0.10]

The above vector can represent a variety of different facets of the frame (or shot), including but not limited to, dominant color, resolution, entity detection (e.g., vehicles, people, brands, etc.), motion, activity, brand, clarity, and any other visual dimension.

In one or more embodiments of the invention, the media platform 100 comprises a recommender system (not shown) including functionality to utilize the shot feature vectors for content recommendation. The recommender system can utilize these vectors, either individually or based on an aggregation that is calculated to represent any segment of the media (e.g., a shot or scene), to recommend the content to end users of a media viewing application based upon interests or other criteria. In one example, the recommender is configured to identify one or more advertisements on the basis of similarity to a given scene of the media item. In this example, the recommender determines that a vehicle ad is the best match for display at a scene break after a segment of a video containing a vehicle driving scene. In another example, a media clip or media preview obtained by the scene break detection service 170 is analyzed to determine that the content corresponds to an action (i.e., based on the feature vector identifying high motion and other facets of the image that correlate with action sequences). Accordingly, in this example, the media clip or preview is selected by the recommender system for presentation to users of the platform with an interest in action media.

Thus, based on the above embodiments, it is evident that any combination of the content recommendation functionality of the recommender system can be utilized in conjunction with advertisement break detection, media clip generation, and/or media preview generation to personalize or otherwise improve the viewing experience.

In one or more embodiments of the invention, the computer vision module 176 includes functionality to calculate a representative feature vector for multiple frames of a video item. As mentioned above, this may be performed by simply selecting a first frame or a random frame of a given shot, for example. In one embodiment, vectors are generated for multiple frames (or all frames) of the shot and subsequently averaged together to generate the representative feature vector. In one embodiment, the computer vision module 176 generates feature vectors for the first and last frame of the shot and subsequently aggregates those into a single representative feature vector. Any number of other variations of feature vector generation can be utilized to generate a vector representation of multiple frames, in accordance with various embodiments of the invention.

In one or more embodiments of the invention, the computer vision module 176 includes functionality to calculate a distance between two shots using the generated feature vectors. The distance between the embeddings can be calculated as a Euclidean distance, for example. Given different vector representations it may be possible to use any number of methods for determining a visual distance/similarity, in accordance with various embodiments. The computer vision module 176 is configured to generate one or more distance scores representing the similarity or context change between any two shots of a given video.

In one example, given three shots of a video (e.g., shots 12, 13, and 14), we get the following Euclidean distances between each pair of shots:

Shot 12 to Shot 13 distance: 15.3

Shot 13 to Shot 14 distance: 20.4

Given the above values, the computer vision module 176 determines that it is advantageous to put a scene break on the Shot 13 boundary, vs shot 14 boundary due to the higher contextual distance between 13 to 14. In one or more embodiments of the invention, shots of a video item are very short by design (usually less than one second). Finding the best shot boundaries for scene breaks by only looking at two consecutive shots may not produce an optimal outcome for every application since it only takes into consideration a short length of the video (<~2 seconds).

In one or more embodiments of the invention, the computer vision module 176 includes functionality to perform a more thorough analysis of the media item for scene breaks, including accounting for the following which may not be desirable scene break indicators:

(i) abrupt camera motion (ii) fast moving object in the scene (iii) change of lighting (iv) animation Accordingly, in one or more embodiments of the invention, the computer vision module 176 includes functionality to perform a multi-shot (or multi-frame) analysis of the media item. For each shot (or frame) that is analyzed, the computer vision module 176 is configured to identify a given number of frames preceding and succeeding the shot boundary. For purposes of this example, we will utilize the symbol N to represent the number of shots preceding and succeeding the shot boundary. Back to the above example, the computer vision module 176 is configured to analyze from N shots before shot 13, to N shots after shot 13. Continuing this example, we will utilize the value N=5 as follows:

Shots [8,9,10,11,12] are the N shots before the shot 13 boundary, and shots [13,14,15,16,17] are the N shots after the shot 13 boundary. The computer vision module 176 extracts the embedding vector of each of these 10 shots resulting in two sets of embedding vectors, each having five vectors in them (set #1 and set #2, for exemplary purposes).

Given the final sets of vectors for the N shots, the computer vision module 176 includes functionality to calculate a distance between the two sets. The computer vision module 176 can be configured to perform the distance calculation in any number of the following ways:

(i) Average-poll all the features in each set and calculate the distance (ii) Max-pool all the features in each set and calculate the distance (iii) Assign the maximum distance between each possible pairs of set #1 and set #2

In one or more embodiments of the invention, the computer vision module 176 includes functionality to calculate the distance across these sets using bi-partite matching.

Bipartite Matching

In one or more embodiments of the invention, the computer vision module 176 includes functionality to generate a graph representation of a shot transition. The graph representation can represent multiple adjacent shots that overlap the targeted shot transition. As described above, given a parameter N, the computer vision module 176 can be configured to identify N shots preceding the target shot transition and another N shots succeeding the target shot transition. In this example, the graph representation comprises the embeddings from each of the N preceding as well as the N succeeding shots.

In one or more embodiments of the invention, the computer vision module 176 includes functionality to perform bipartite matching using the graph representation of a shot transition. The computer vision module 176 is configured to formulate the described N to N distance as a graph bi-partite matching problem. In this way, for each shot in the set before the start of the candidate shot (set #1), it is assumed that there is a vertex on the left, and for each shot in the set after the start of the candidate shot there is a vertex on the right. Thus, the computer vision module 176 models the problem as having N vertices on the left and N vertices on the right resulting in N^2 (=25 in the N=5 example) edges. Each edge has a weight equal to the distance between the shots on its two ends. In the example above, the edge between shots 12 and 13 is 15.3 as described.

In one or more embodiments of the invention, generally, the computer vision module 176 includes functionality to identify a first subset of the set of contiguous shots preceding the candidate scene break timestamp and a second subset of the set of contiguous shots succeeding the candidate scene break timestamp. Any grouping of frames of the media item can be utilized, so long as the features can be represented in vector format such that the computer vision module 176 is configured to calculate or obtain the distance between any two such vectors. The candidate scene break timestamp in this case can refer to a starting timestamp of the "candidate scene break," such that the candidate scene break itself is included in the second subset of contiguous shots.

Figure 7A:
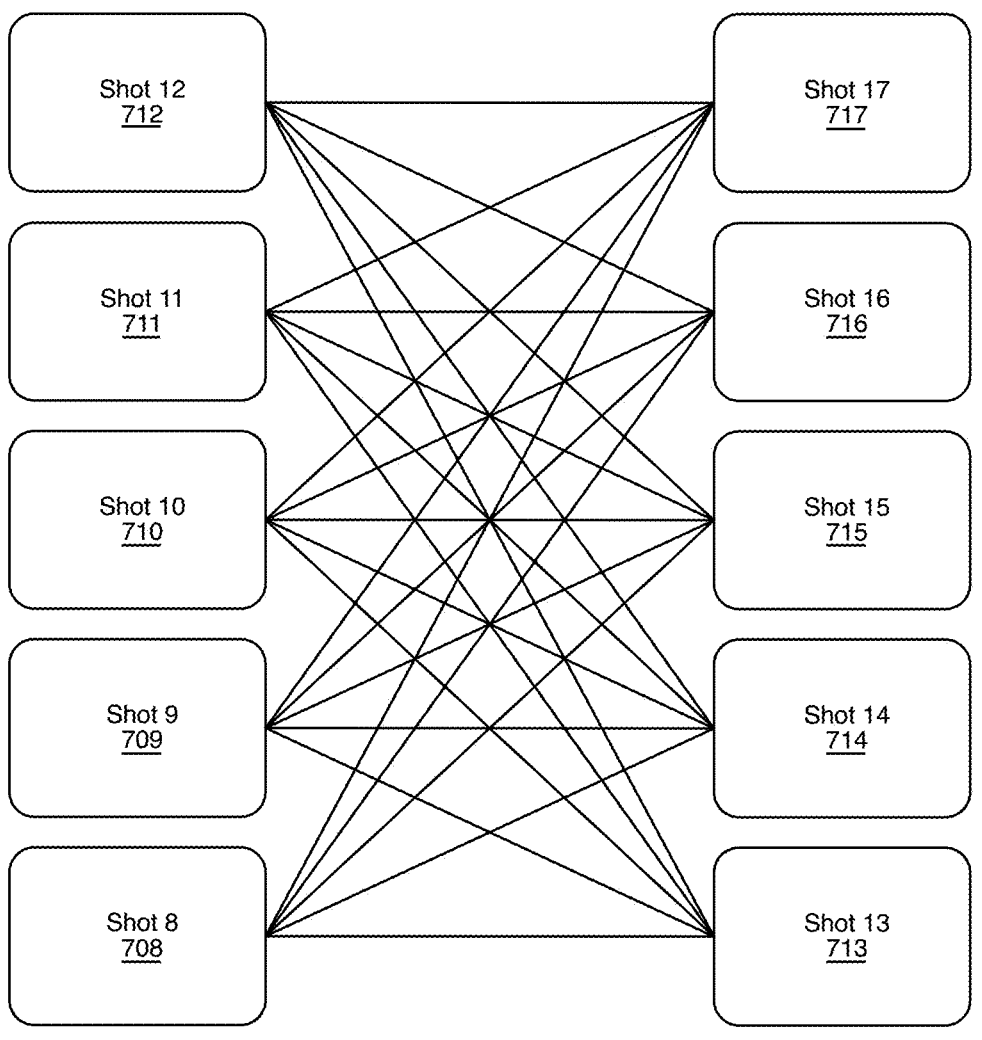

In one or more embodiments of the invention, generally, the computer vision module 176 includes functionality to calculate a score for the candidate scene break timestamp representing a visual distance between the first subset of contiguous shots and the second subset of contiguous shots. FIG. 7A depicts an example of the graph representation of the two sets of scenes preceding and succeeding the candidate timestamp used as an input to the bipartite matching process performed by the computer vision module 176. Other methods can be employed in accordance with various embodiments of the invention.

Continuing the example of FIG. 7A, FIG. 7B depicts the distance scores calculated by the computer vision module 176 between each scene of the first subset of scenes (i.e., those preceding the candidate timestamp) and each scene of the second subset of scenes (i.e., those succeeding the candidate timestamp). The computer vision module 176 is configured to calculate distance scores upon the vector representations of each pair of analyzed scenes. In one embodiment of the invention, the computer vision module 176 is configured to perform the distance score calculations in parallel using multi-threading, multi-processing, and any other parallelization mechanism to reduce the latency of the request.

Figure 7C:
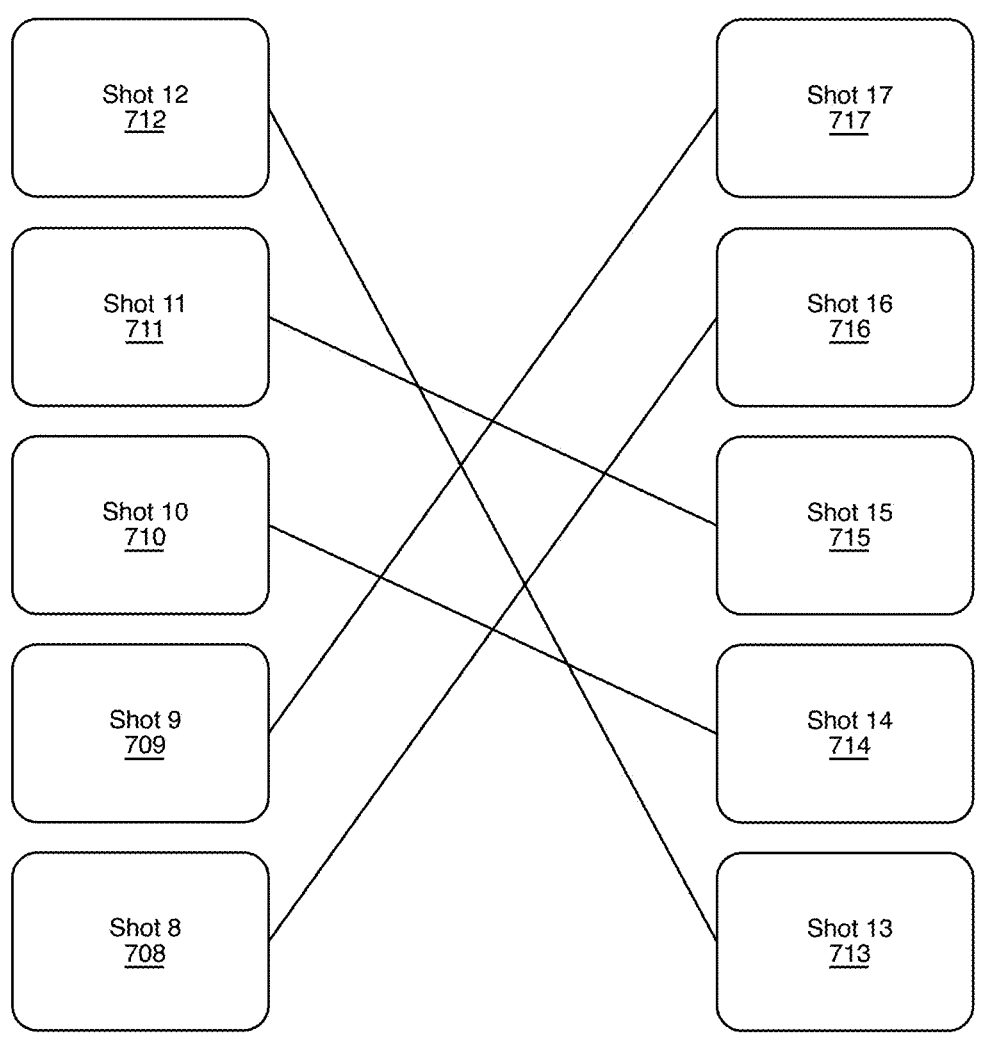

FIG. 7B depicts a solution to the bipartite matching process calculated by the computer vision module 176 for the example of FIG. 7A. The values of the graph of FIG. 7B show that the best distance detected by the computer vision module 176 around the shot 13 boundary is the pairings of [s12 to s13] (illustrated by highlighted value 15.30379017), [s11 to s15] (illustrated by highlighted value 20.23956734), [s10 to s14] (illustrated by highlighted value 19.04404975), [s09 to s17] (illustrated by highlighted value 26.52708796), and [s08 to s16] (illustrated by highlighted value 18.38778232). This solution is illustrated graphically by FIG. 7C.

Figures 7D, 7E:
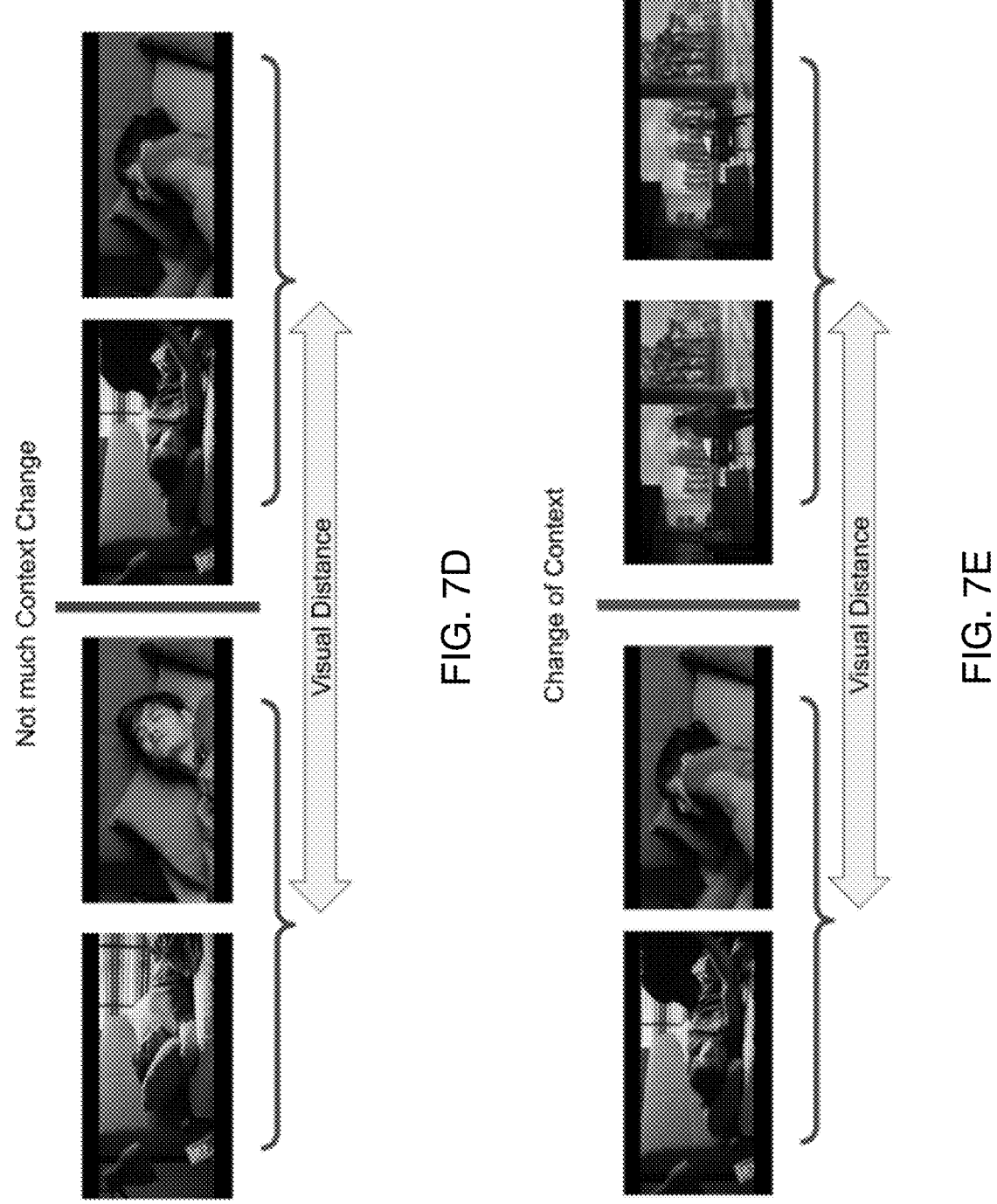

FIG. 7D depicts an example of a shot boundary without a significant context change. In the example of FIG. 7D, two shots preceding the shot boundary and two shots occurring after the shot boundary all occur inside a bedroom. FIG. 7E depicts an example of a shot boundary with a significant context change. In the example of FIG. 7E, two shots preceding the shot boundary occur inside a bedroom, whereas two shots after the boundary occur outdoors.

In one embodiment of the invention, shot boundaries with larger contextual changes may be better for certain applications (e.g., placing advertisements) because there may be a lower chance of breaking ongoing action or act in the media item.

In one example, a scoring function is defined as follows:

$$F(s_i) = D([s_{i-N}, s_{i-N+1}, \ldots, s_{i-1}], [s_i, s_{i+1}, \ldots, s_{i+N-1}])$$

In this example, F is the scoring function, and s_i represents deep embedding features extracted from shot i. In this example, the scoring function can be defined as a distance function whereby higher distance between shots before and after a shot boundary results in a higher score.

Continuing the example, the distance function, D, utilizes a bi-partite matching algorithm. Other valid implementations can be used in accordance with various embodiments of the invention. One example of an alternative distance function utilizes a trainable distance metric process.

In this example, each shot is paired in $[s_{i-N}, s_{i-N+1}, \ldots, s_{i-1}]$ to one and only one shot in $[s_i, s_{i+1}, \ldots, s_{i+N-1}]$ (and vice versa) in a way to minimize total distances in pairs.

Figure 7F:
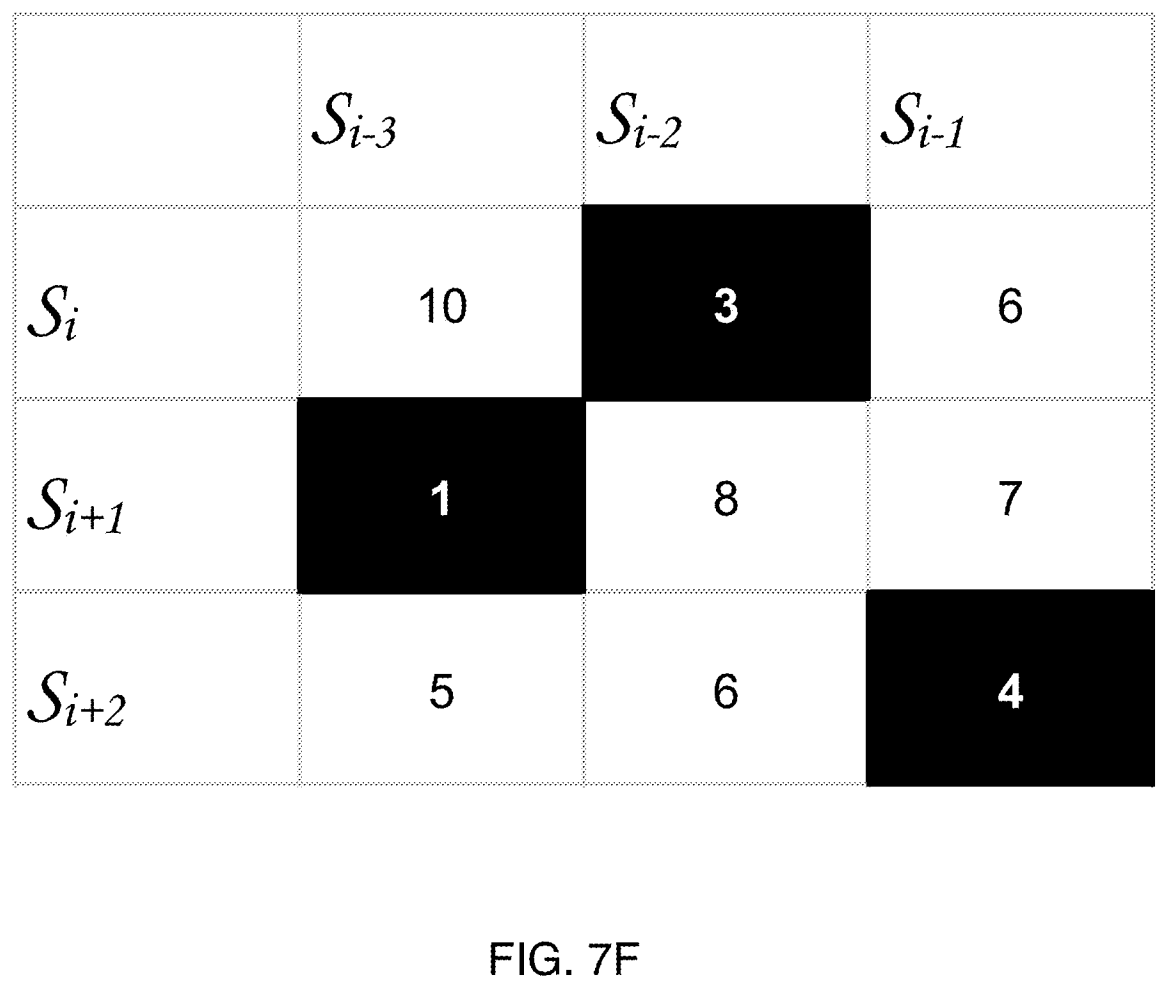

FIG. 7F depicts this example given the value N=3. The values in the chart of FIG. 7F show the one to one distances between all of the shots before the boundary i, to all of the shots after boundary i. Highlighted cells of FIG. 7F indicate an optimal solution of the bipartite matching process (e.g., calculated by computer vision module 176). In this example, there may be no other matching that can provide a smaller summation over the selected pairs of shots distance. The distance function for the shot boundary i is as follows:

$$D_i = \min\left(\sum_{(n,m)} |s_n - s_m|\right) | (i - N) \le n \le (i - 1)$$

and $$i \le m$$

$$\le (i + N - 1)$$

and $n/m$ is only paired with $m/n$

In one or more embodiments of the invention, generally, the computer vision module 176 includes functionality to solve the above equation using the Hungarian algorithm.

In one or more embodiments of the invention, generally, the computer vision module 176 includes functionality to obtain the distance scores selected by the optimal/selected path (e.g., via bipartite matching), and to utilize those scores to calculate a score for the candidate scene break (e.g., scene 13). For purposes of this disclosure, the calculated score can be described as a score for the candidate scene break or the candidate scene break timestamp, interchangeably. In this way, in certain contexts, the initial timestamp of the candidate scene break is sometimes used to reference the scene break or vice versa. The computer vision module 176 can be configured to utilize any number of processes for calculating the score using the distance scores of the graph as input. For example, the computer vision module 176 can average the distances of the selected graph pairs and, in the example of FIGS. 7A-7C, select this average as the score for the shot 13 boundary. In the example depicted by FIGS. 7A-7C, the score for the shot 13 is 19.9, which is the average of the highlighted numbers.

In one or more embodiments of the invention, generally, the scene break detection service 170 includes functionality to optimize the calculation of shot boundary scores by incorporating audio break timestamps, streaming segment timestamps, and any number of criteria or heuristic rules. In order to reduce the number of shot boundary scores that must be calculated for a given media file, and to improve the quality of the calculated shot boundaries, the scene break detection service 170 may be configured to perform audio break detection on an audio component of the media item prior to the computer vision analysis. In one embodiment, the scene break detection service 170 then eliminates shots corresponding to timestamps that fall outside of a predefined time range of the calculated audio break timestamps and/or streaming segment timestamps derived or obtained from a streaming manifest file of the media item. Other criteria and heuristics used by the scene break detection service 170 to eliminate one or more candidate shots can include, but are not limited to, a starting time range of the media item (e.g., to eliminate the credits scene of a movie or show), an ending time window of the media item, and any number of predefined segments of the media item (e.g., provided by human review or other sources).

In one or more embodiments of the invention, the scene break detection service 170 includes functionality to use the criteria or heuristics to eliminate sections of the media item prior to any analysis of the media item (e.g., audio analysis, segment analysis, computer vision analysis). In this way, the scene break detection service 170 is not required to perform shot detection on the whole media file. In one embodiment, other criteria and heuristics can be utilized by the scene break detection service 170 after audio break analysis. Examples of criteria utilized after audio analysis can include, but are not limited to, a minimum duration for audio "scenes", a minimum threshold of audio break scores, and any other criteria for eliminating one or more of the candidate audio break scenes/timestamps. Furthermore, in one embodiment of the invention, the scene break detection service 170 includes functionality to utilize criteria and heuristics to eliminate any detected scene breaks after completion of computer vision (CV) analysis. One example of post-CV selection is the dynamic programming analysis described in the present disclosure. Generally, the scene break detection service 170 can be configured to use business logic to determine that certain identified scenes of the media item should be eliminated from the final result set. Examples of criteria and heuristics for eliminating detected scenes after computer vision analysis can include, but are not limited to, a maximum number of scenes per duration of time, a minimum number of scenes per duration of time, a minimum scene break detection score, and any other mechanism for pruning or eliminating one or more candidate scenes/timestamps.

In one or more embodiments of the invention, the scene break detection service 170 includes functionality to rank one or more candidate scene breaks according to a set of heuristic rules. Thus, the heuristics may involve more than a simple binary decision process for eliminating certain scenes, but can also be configured to generate a heuristic score for each scene break. In one example, the heuristic can be a process for generating a quality score that is application specific. In this example, for the purpose of advertisement break detection, the scene break detection service 170 scores the detected scenes according to their candidacy for displaying an advertisement. Other applications can similarly involve heuristic scoring, for example, for the purpose of media preview generation, and advertisement media clip generation.

The aforementioned criteria and heuristics can also be application specific. For example, in the context of advertisement break detection, the scene break detection service 170 can be configured to utilize ad-related criteria to eliminate one or more segments of the media item from candidacy for an advertisement break. Similarly, for media preview generation, the scene break detection service 170 can be configured, for example, to only analyze an initial fifteen minute time period of a given video media item.

Figure 8:
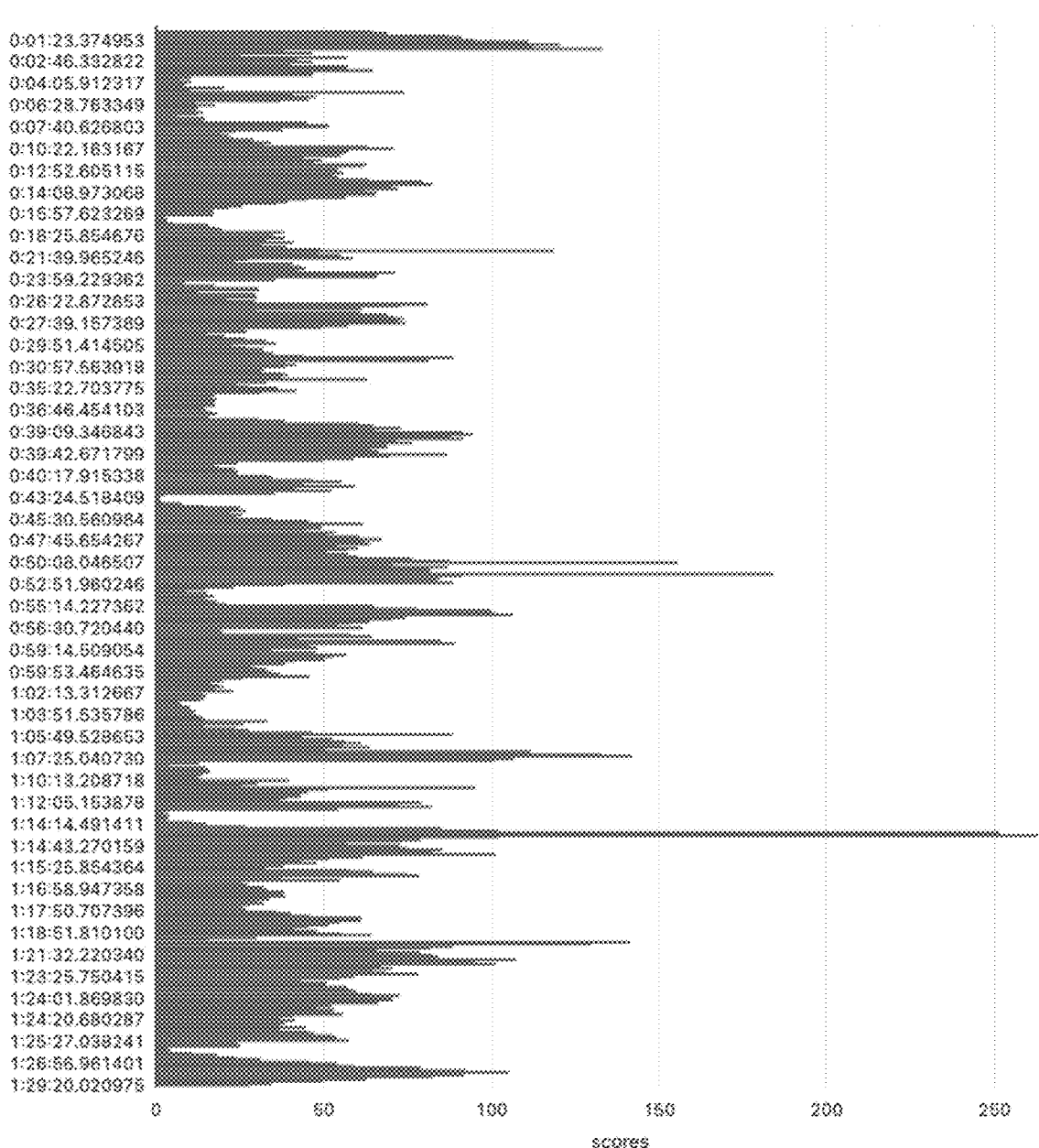
FIG. 8 shows a graph of shot boundary scores, in accordance with one or more embodiments.

FIG. 8 shows an example graph output of shot boundary scene break scores performed on a video media item. In this example, the media item is a movie with a duration of ninety minutes. In this example, the scene break detection service 170 eliminates the first five minutes and the last ten minutes of the movie from analysis due to predefined criteria. The scene break detection service 170 then performs audio analysis on an audio component of the movie (excluding the segments according to the defined criteria), and identifies 5000 candidate shots with an average duration of about 0.96 seconds per shot. Continuing the example, the scene break detection service 170 performs audio analysis on the movie to identify a set of audio break timestamps corresponding to audio scenes detected in the movie. The scene break detection service 170 also identifies a set of streaming segment timestamps and determines that a large majority of the 5000 candidate shots fall outside of a predefined 100 millisecond threshold of both an audio break timestamp and streaming segment timestamp. Accordingly, the scene break detection service 170 eliminates 4513 candidate shots from consideration before performing computer vision analysis on the movie. FIG. 8 depicts a graph of the scene break scores calculated by the computer vision module 176 on the remaining 487 shots (using N=10 in this example).

Selection of the N Parameter

Generally, in one or more applications and embodiments, it is possible that too small of an N value can result in very noisy results. For example, the scene break detection service 170 can detect a high peak in the scores due to camera motion or change of lighting. Generally, in one or more applications and embodiments, it is possible that too large of an N value can result in very smooth changes in the score. In one or more embodiments of the invention, too much "smoothness" may not result in an improvement in the performance of the model. It is often the case, in one or more embodiments, that peaks are necessary in the results in order for the scene break detection service 170 to select with high confidence. For example, if several boundaries have the same or similar scores back to back, it may not be possible for the scene break detection service 170 to select the best one with a high degree of confidence (e.g., a high confidence score). Thus, too large of an N value can have a negative impact.

Post-CV Selection and Applications

In one or more embodiments of the invention, the scene break detection service 170 includes functionality to select, based at least on the score of each of the set of candidate scene break timestamps, a final set of scene break timestamps for performing a media action. The media action can include, but is not limited to, media preview generation, advertisement break detection, advertisement media clip generation, intermission detection, learning break detection (e.g., in the context of lecture or learning media), and any other application of scene break detection.

Dynamic Programming

In one or more embodiments of the invention, the dynamic programming module 178 includes functionality to perform dynamic programming to select from a set of candidate scene breaks of a media item. Candidate scene breaks can be the result of audio break analysis, streaming segment analysis, and/or computer vision analysis in accordance with various embodiments of the invention. Dynamic programming that involve selecting an optimal or near-optimal subset of the candidate scene breaks given one or more criteria, such as:

(i) Do not allow two scene break timestamps to be closer than T second (e.g., 180 seconds or 3 minutes).

(ii) Do not allow scene breaks in first A seconds of the media item (iii) Do not allow scene breaks in last B seconds of the media item In one or more embodiments of the invention, the dynamic programming module 178 includes functionality to select a best possible subset of the scene boundaries to maximize a score of our selection while holding above rules. Dynamic programming can refer to any method of breaking the selection into a smaller set of sub-problems and then recursively finding the solutions to those sub-problems. In the example criteria above, each criteria can represent a dynamic programming sub-problem.

Human Review Via Admin Interface

In one or more embodiments of the invention, the scene break detection service 170 includes functionality to provide a set of scene break timestamps to an admin interface (not shown) via media content API 110 for display to an end user. The admin interface can include a user interface for approval, denial, and/or modification of one or more detected scenes of a media item.

In one or more embodiments of the invention, the scene break detection service 170 includes functionality to receive an approval by the end user of one or more scene break timestamps. The scene break detection service 170 can further be configured to receive a designation of one or more detected scenes for one or more specific applications from an end user (e.g., an administrator or reviewer), such as advertisement delivery, media break detection, learning break or intermission, and etc.

In one or more embodiments of the invention, the scene break detection service 170 includes functionality to designate scene breaks as candidate scene breaks until approval or review from a user. Upon approval, the scene break detection service 170 then flags the scene breaks as ready for application in any number of applications or for general consumption via media content API 110.

Ad Break

In one or more embodiments of the invention, the scene break detection service 170 includes functionality to perform ad break placement based on one or more scene break timestamps of a media item. The scene break detection service 170 can be configured to identify scene breaks and to utilize advertisement specific criteria and heuristics to identify one or more scene breaks specifically suited for delivering advertisements during playback of a media item. This can include, for example, obtaining a number of desired advertisements or a number of desired advertisements per duration of playback and then selecting the correct number of advertisement breaks accordingly. The scene break detection service 170 can be integrated with or communicatively coupled with an advertising exchange in order to provide on-demand scene break generation for advertisement purposes. Furthermore, the scene break detection service 170 can be configured to obtain candidate advertisements and to match them with one or more scene breaks in order to optimize the delivery of advertisements. For example, given an advertisement inventory of one or more variable duration advertisements, the scene break detection service 170 can identify a set of advertisements suited to meet the requirement of advertisement delivery according to one or more advertisement frequency criteria. Thus, the scene break detection service 170 detects optimal advertisement breaks for the media item, detects candidate advertisements from inventory, and matches the inventory to serve a set of ads that meets any arbitrary set of business requirements. Thus, in one or more embodiments of the invention, the scene break detection service 170 includes functionality to generate an ad inventory item for the media item in relation to the first ad break timestamp, wherein the advertisement is matched to the ad inventory item by an advertising exchange process.

Media Preview

In one or more embodiments of the invention, the media service 108 includes functionality to generate a media preview of a media item. The media service can be configured to identify a duration corresponding to the request and to select one or more scenes for the media preview in order to satisfy the duration. The duration can be a range, a fixed duration value, or a fixed duration value with a predefined tolerance, in accordance with various embodiments. The media service 108 can generate the preview as a single scene of the media item detected by the scene break detection service 170, or in one or more embodiments, by combining one or more of said scenes to generate the media preview. Media preview content can be generated for movies, television shows, user generated video or audio content, social media content, and any number of other media types.

In one or more embodiments of the invention, the media service 108 includes functionality to serve to one or more integrated applications, or to an end user application for display to the user on a client device.

In one or more embodiments of the invention, the scene break detection service 170 includes an unsupervised machine learning model for clustering scenes of one or more media items by visual category. The scene break detection service 170 can be configured to generate a set of feature vectors depicting at least one visual attribute of the candidate scene (e.g., according to any of the feature vector generation processes depicted in the present disclosure) and to executing the machine learning model to infer a visual category for the scene. The machine learning model can be trained to generate the set of categories using a set of training data comprising media content of various types.

In one or more embodiments of the invention, the scene break detection service 170 includes functionality to select a subset of candidate scenes having a common inferred visual category for constructing the media preview clip. Thus, the scene break detection service 170 can stitch multiple scenes into a preview based on commonality (or a desired difference) between the scenes. Any other mechanism for selection of scenes can be used in the generation or delivery of media preview content, in accordance with various embodiments of the invention.

Media Clip Generation

In one or more embodiments of the invention, the media service 108 includes functionality to generate a media clip of a media item. Similar to media previews, media clips can be generated based on a desired duration or any number of other criteria. Unlike media previews, which may be selected with the intention of providing a summary or understanding of the narrative of the media item, media clips may be selected for purposes of advertising, marketing, or generating virality.

In one or more embodiments of the invention, the media service 108 includes functionality to infer a virality of a media item. In one or more embodiments, virality can be represented as a numeric score or a matrix representing different facets of virality across demographic groups, genre, medium (social, streaming, network, etc.), and more. In one or more embodiments of the invention, the scene break detection service 170 includes a supervised machine learning model (not shown) configured to infer the virality score of one or more media clips or scenes. Virality in this context can include likelihood of engagement, retention, or viewership using any number of predefined engagement criteria that can be determined from production data.

The scene break detection service 170 can be configured to generate a set of feature vectors including at least one visual attribute of the candidate segment, a set of actor attributes of the media item, and a set of genre attributes of the media item. Thus, labeled datasets can be used to generate the inference and to optimize for a variety of correlations that may exist between various criteria and the likelihood of a media item to "go viral" on a social media platform, for example. The scene break detection service 170 can then select a candidate scene or set of scenes having a highest virality score for generation of the media clip.

In one or more embodiments of the invention, the scene break detection service 170 includes functionality to perform learning break detection on a learning-related media item. Learning related media items can include, but are not limited to, an online course or lecture, a recorded class lesson, an instructional video, and a user-generated product review. The scene break detection service 170 can be configured to detect scene breaks that are optimized for learning and retention of the material by the end user. The dynamic programming process described herein and performed by the dynamic programming module 178 can be optimized with learning related constraints and criteria. One example of such a criteria is to select from candidate scene breaks towards the middle or end of the media item rather than at the beginning when users are most likely to lose focus and give up or abandon the learning process. Other variations of learning-related optimization can be utilized in accordance with various embodiments of the invention.

In one or more embodiments of the invention, the advertising service 104 includes the advertising exchange functionality or is an advertising exchange. In other embodiments, the advertising service is an adapter configured to interface or integrate with an external advertising exchange. Any number of other architectural designs can be configured to utilize the functionality of the scene break detection service 170 for the purpose of scene break detection.

In one or more embodiments of the invention, the user analytics service 102 includes functionality to identify, obtain, and store user engagement and analytics data. User analytics data can be stored in the analytics repository 150. The user analytics service 102 can be configured to provide engagement and other analytics data to the scene break detection service 170, the media service 108, and/or the advertising service 104 for the purpose of evaluating performance and/or training of the various models disclosed herein. Online training of the various models can also be performed by obtaining user data and feedback to inferences of the model(s) and utilizing them to train or retrain the model(s). Other functionality which relies on analytics described with respect to the various components can involve said components interfacing with the user analytics service 102 to obtain said data.

In one embodiment of the invention, the scene break detection service 170 is a component of the online media service 108 or the advertising service 104. The arrangement of the components and their corresponding architectural design are depicted as being distinct and separate for illustrative purposes only. Many of these components can be implemented within the same binary executable, containerized application, virtual machine, pod, or container orchestration cluster. Performance, cost, and application constraints can dictate modifications to the architecture without compromising function of the depicted systems and processes.

Although the components of the media platform 100 are depicted as being directly communicatively coupled to one another, this is not necessarily the case. For example, one or more of the components of the media platform 100 may be communicatively coupled via a distributed computing system, a cloud computing system, or a networked computer system communicating via the Internet.

Flowcharts

Figure 2:
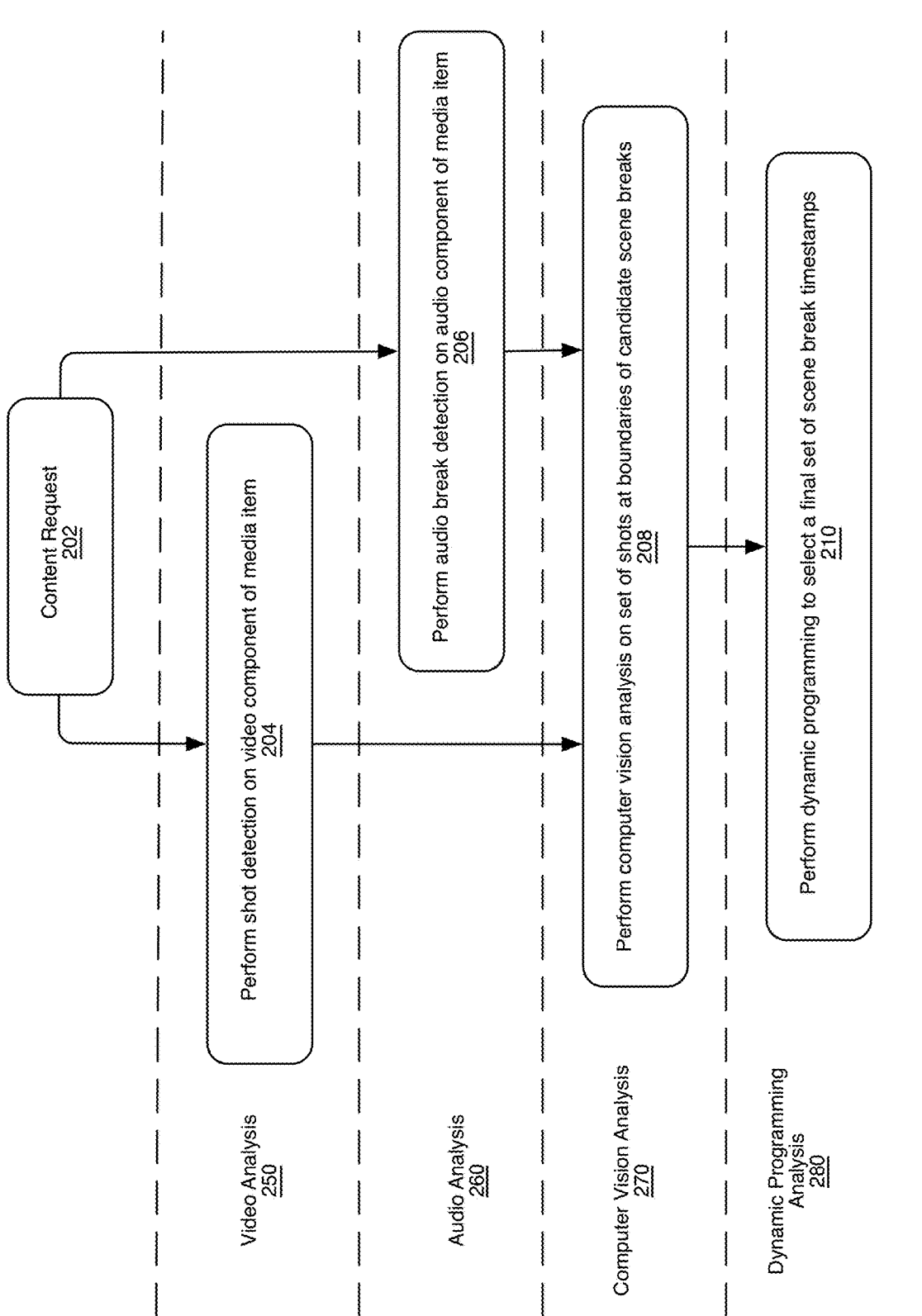
FIGS. 2, 3, 4A, 4B, 5, 6A, and 6B show flowcharts depicting scene detection processes in accordance with one or more embodiments.

FIG. 2 shows a flowchart of a method for scene break detection. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 2 should not be construed as limiting the scope of the invention.

In STEP 202, a content request is received. The content request can be for scene detection, advertisement break detection, media preview generation, or any other application involving scene break detection, in accordance with various embodiments. In stage 250, video analysis is optionally performed to identify a set of shots in the media item (STEP 204). The set of shots can consist of one or more frames of the video, for example, grouped on the basis of some criteria for visual similarity. In one embodiment, shot detection involves comparison of adjacent frames of the video.

In stage 260, audio analysis is performed. This can include audio break detection on an audio component of the media item to identify one or more audio scenes (STEP 206). Audio analysis can include speech detection, music or background noise detection, and any other procedure for designating one or more segments of the audio file as audio "scenes" that should be treated as uninterruptible or less suited for interruption during playback of the media item. It is important to note that, in one embodiment, STEP 204 and STEP 206 are performed concurrently in order to accelerate the process of FIG. 2. Other STEPS may similarly be parallelized in various embodiments.

In stage 270, computer vision analysis is performed on a video component of the media item. Prior to computer vision analysis, any number of the candidate shots from STEP 204 may be eliminated according to one or more business criteria or heuristics. The remaining shots may be utilized as inputs to the computer vision analysis stage for scoring and selection. The computer vision analysis then involves scoring of each candidate shot by taking N shots before and N shots after a starting timestamp of the candidate shot and performing a visual comparison of the two sets of shots. This multi-shot analysis generates an improved and more contextual score by optimizing for the surround shots rather than a simple shot-by-shot analysis. The output of the computer vision analysis is a score generated for each of the remaining shots.

In stage 280, a dynamic programming process is executed on at least a subset of the highest scoring shots (or all of the scored shots) in order to detect the final set of scenes. The process can involve identifying one or more criteria that can be modeled as a sub-problem of the selection, then executing a recursive process of satisfying those criteria by resolving the sub-problems in order to calculate a final score for each of the shots. A final set of scene break timestamps is then selected for the purpose of any number of applications.

FIG. 3 shows a flowchart of an example of scene break detection. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 3 should not be construed as limiting the scope of the invention.

In STEP 310, a video media item is obtained for scene break detection. In STEP 320, video analysis is performed to detect a number of shot boundaries for the video. In STEP 330, audio analysis is performed to detect a number of audio "scene" boundaries for an audio component of the video. Any shots not falling within a predefined proximity of at least one audio scene boundary are then eliminated as inputs for further analysis. Similarly, any audio scene boundaries not coinciding with at least one timestamp of a candidate video shot are eliminated from further analysis FIG. 3 depicts an example elimination of two video shots and one audio shot. It should be noted that the video analysis component of this process may utilize both the start and end timestamp of a given video shot, or simply one timestamp representative of the shot (e.g., a starting timestamp).

In STEP 340, computer vision analysis is performed on the media item. The output of the computer vision analysis is a scoring of each of the remaining shots/timestamps. In STEP 350, a best subset of the score shots is selected on the basis of the calculated scores and/or any number of other business criteria or application-specific heuristics.

Figure 4A:
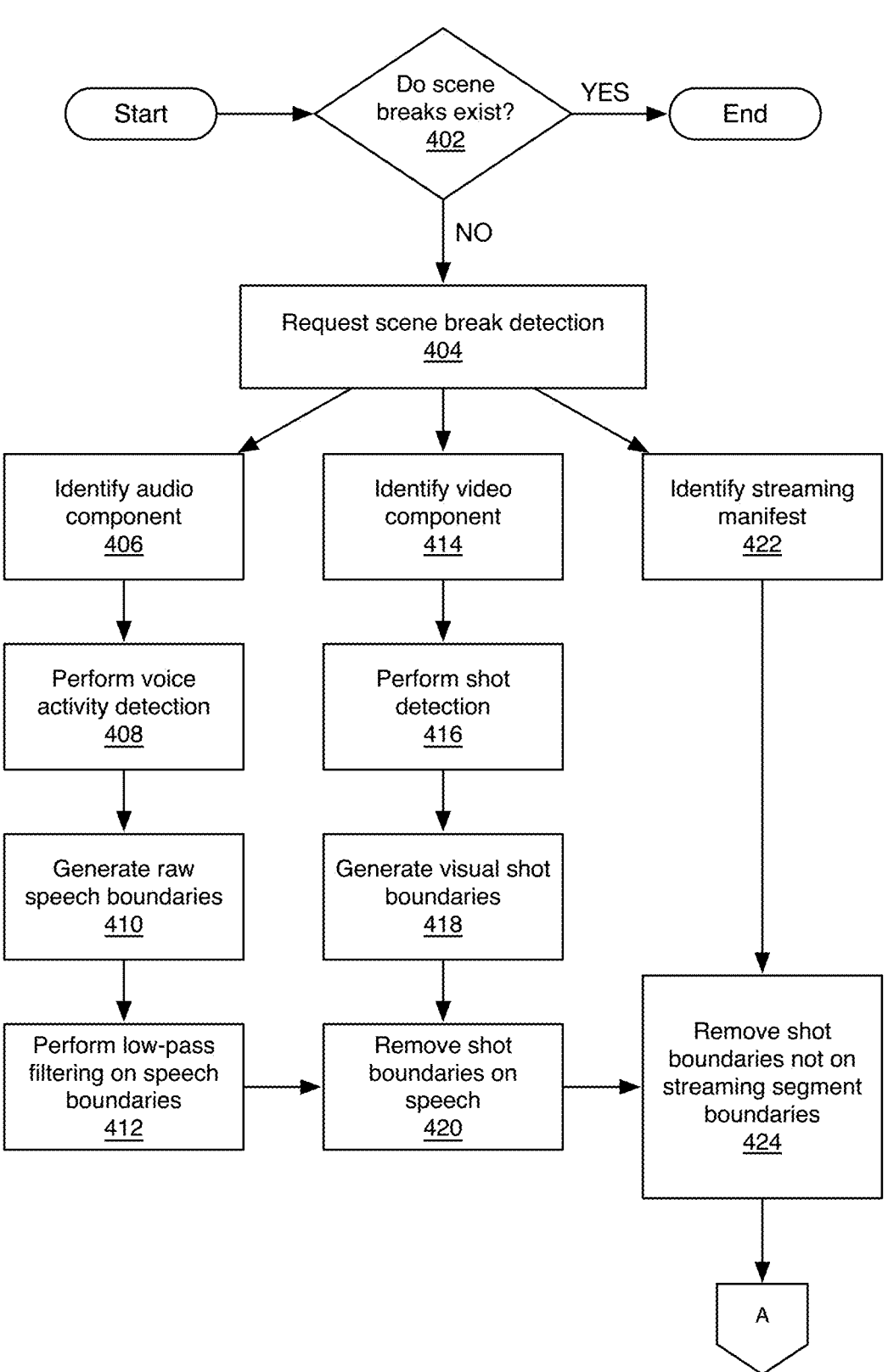
Figure 4B:
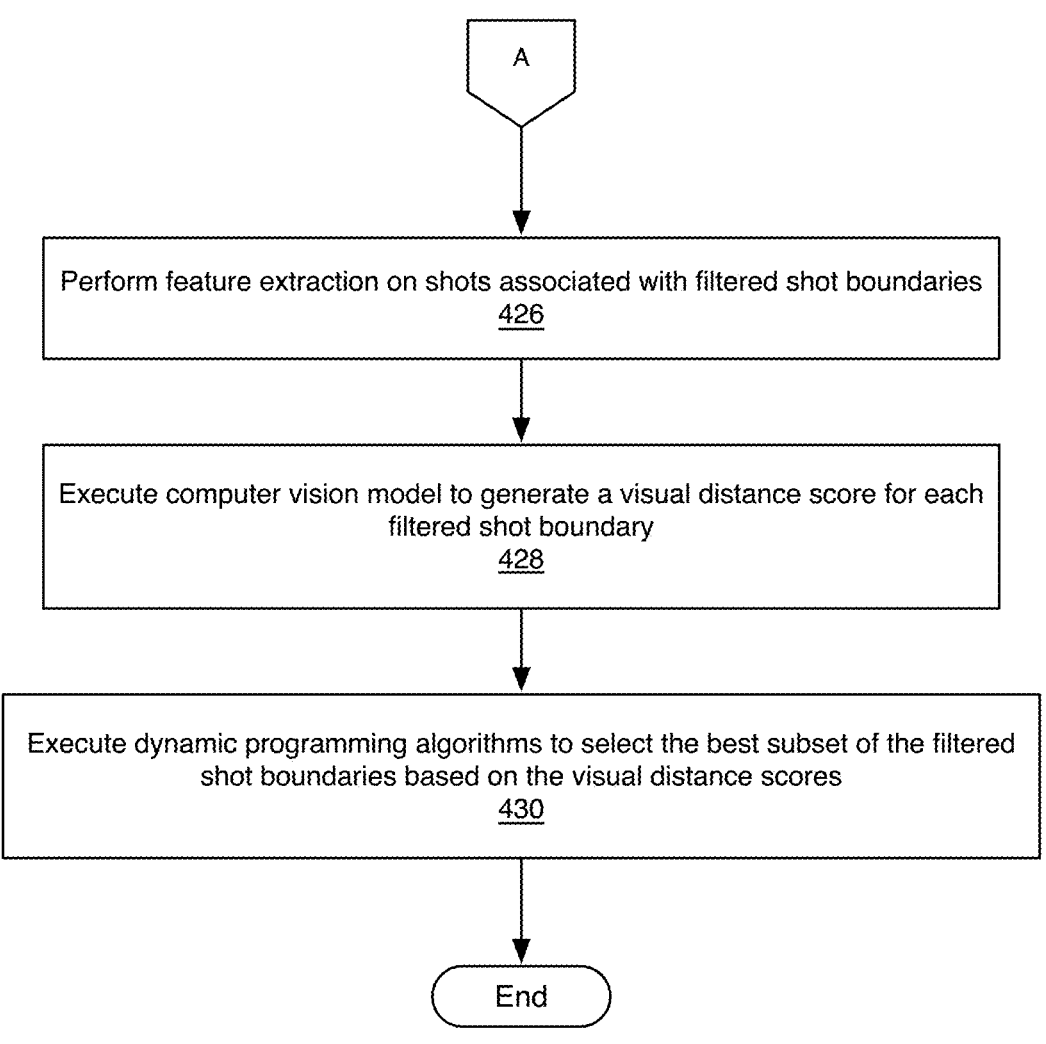

FIGS. 4A and 4B show flowcharts of a method for scene break detection. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIGS. 4A and 4B should not be construed as limiting the scope of the invention.

In STEP 402, a media file is obtained for scene break analysis. If the process determines that scene breaks are already identified for the media file, the scene breaks are returned to the requesting entity and the process ends. If it is determined that scene break analysis is not yet performed, the process proceeds to STEP 404.

In STEP 404, a request for scene break detection is generated and received by a processor or service (e.g., scene break detection service 170 of FIGS. 1A and 1B, discussed above). In STEPS 406, 408, 410, and 412, audio analysis is performed on an audio component of the media item. This can involve voice activity detection (STEP 408) and results in audio scene boundaries (e.g., speech boundaries) which are then further refined or eliminated in low-pass filtering (STEP 412). Low-pass filtering can include any number of criteria for eliminating boundaries that fail to meet one or more predefined criteria.

In STEPS 414, 416, and 418, a video analysis process is performed to generate one or more shots based on a video component of the video item. Shot detection is performed to generate shot boundaries in STEP 418.

In STEP 420, shot boundaries that do not reside within a predefined proximity of an audio scene boundary are eliminated. Similarly, audio scene boundaries that do not reside within a predefined proximity of a video shot are also eliminated from further analysis.

In STEP 422, a streaming manifest file is utilized to identify a set of streaming segments of the media item. The streaming segments depict timestamps that can be utilized to identify playback initiation points on the media item, for example. The remaining shots from STEP 420 are then analyzed to eliminate any shots that reside outside of a predefined proximity to one of the streaming segment boundaries identified from the streaming manifest. The process then proceeds to STEP 426 of FIG. 4B.

In STEP 426, feature extraction is performed on the remaining shots. The resulting feature vectors depict a numeric representation of any number of visual facets of each shot. In STEP 428, a computer vision model is executed using the feature vectors to generate a visual distance score for each of the shot boundaries. The computer vision process can involve a multi-shot analysis involving N shots preceding and N shots succeeding each shot that is being scored/analyzed.

For purposes of this disclosure, the term "model" can refer to a machine learning component or a non-machine learning component of the system configured to perform one or more of the aforementioned processes.

In STEP 430, a dynamic programming process is executed to select the best subset of the scored shot boundaries as scene breaks. This can be performed on the basis of the visual distance scores and/or any number of other business or application-specific criteria, in accordance with various embodiments.

Figure 5:
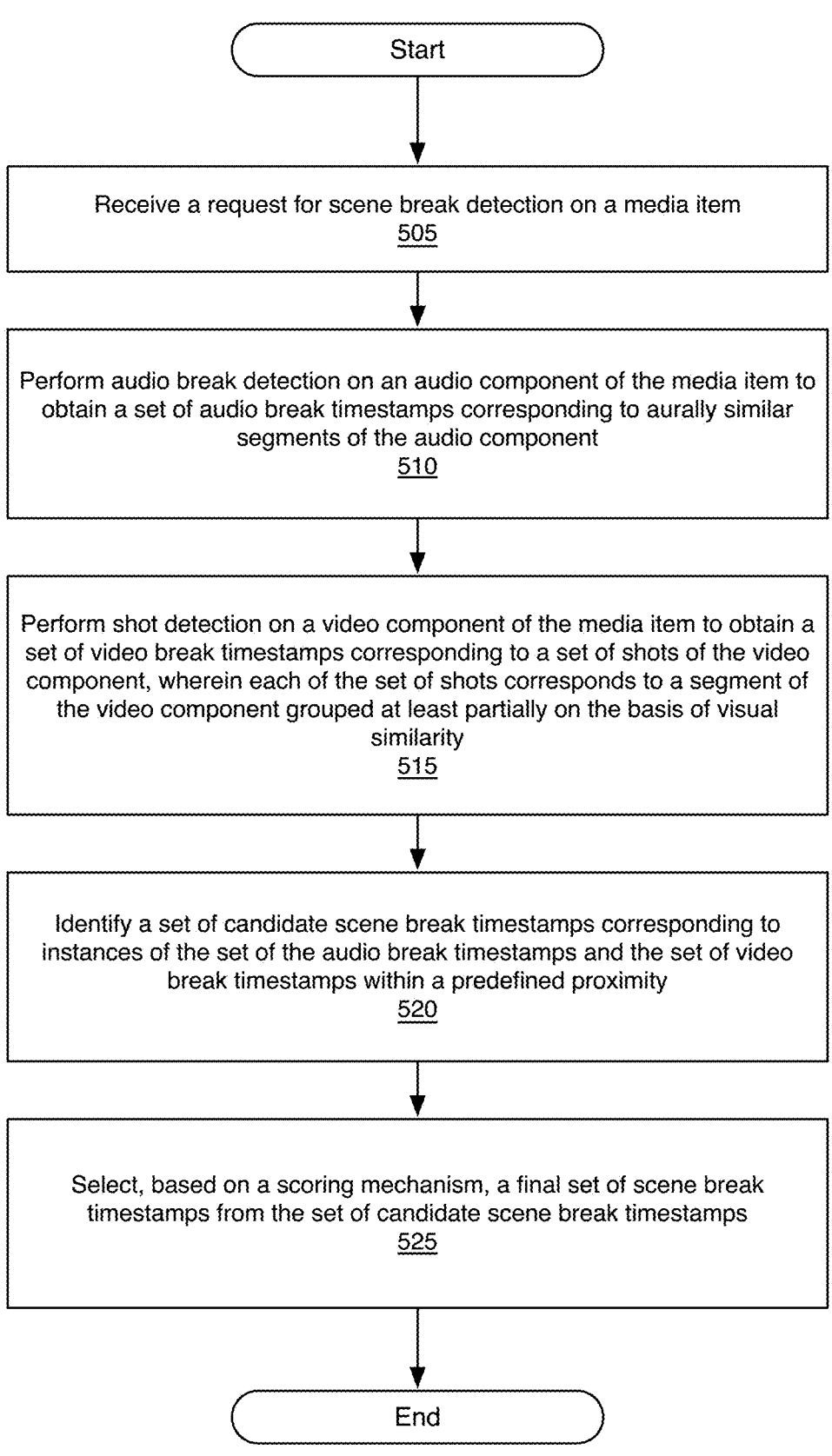

FIG. 5 shows a flowchart of a method for scene break detection with a generic scene break scoring mechanism. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope of the invention.

In STEP 505, a request for scene break detection on a media item is received. In STEP 510, audio break detection is performed on an audio component of the media item to obtain a set of audio break timestamps corresponding to aurally similar segments of the audio component. This may involve speech detection or any number of other techniques for boundary detection on the audio file.

In STEP 515, shot detection is performed on a video component of the media item to obtain a set of video break timestamps corresponding to a set of shots of the video component, wherein each of the set of shots corresponds to a segment of the video component grouped at least partially on the basis of visual similarity. In one embodiment, the shots can correspond to a significantly shorter duration than scenes, and are detected using only by comparing each frame of the video to one other adjacent frame of the video (preceding or succeeding the frame).

In STEP 520, a set of candidate scene break timestamps are identified corresponding to instances of the set of the audio break timestamps and the set of video break timestamps within a predefined proximity. Thus, this step of the process can involve pruning the set of detected shots to eliminate a subset of the shots from further analysis.

In STEP 525, a final set of scene break timestamps are selected from the set of candidate scene break timestamps based on a scoring mechanism. The scoring mechanism can include, but is not limited to, a computer vision analysis or any other mechanism for scoring, ranking, and/or selecting from the set of candidate shots.

Figure 6A:
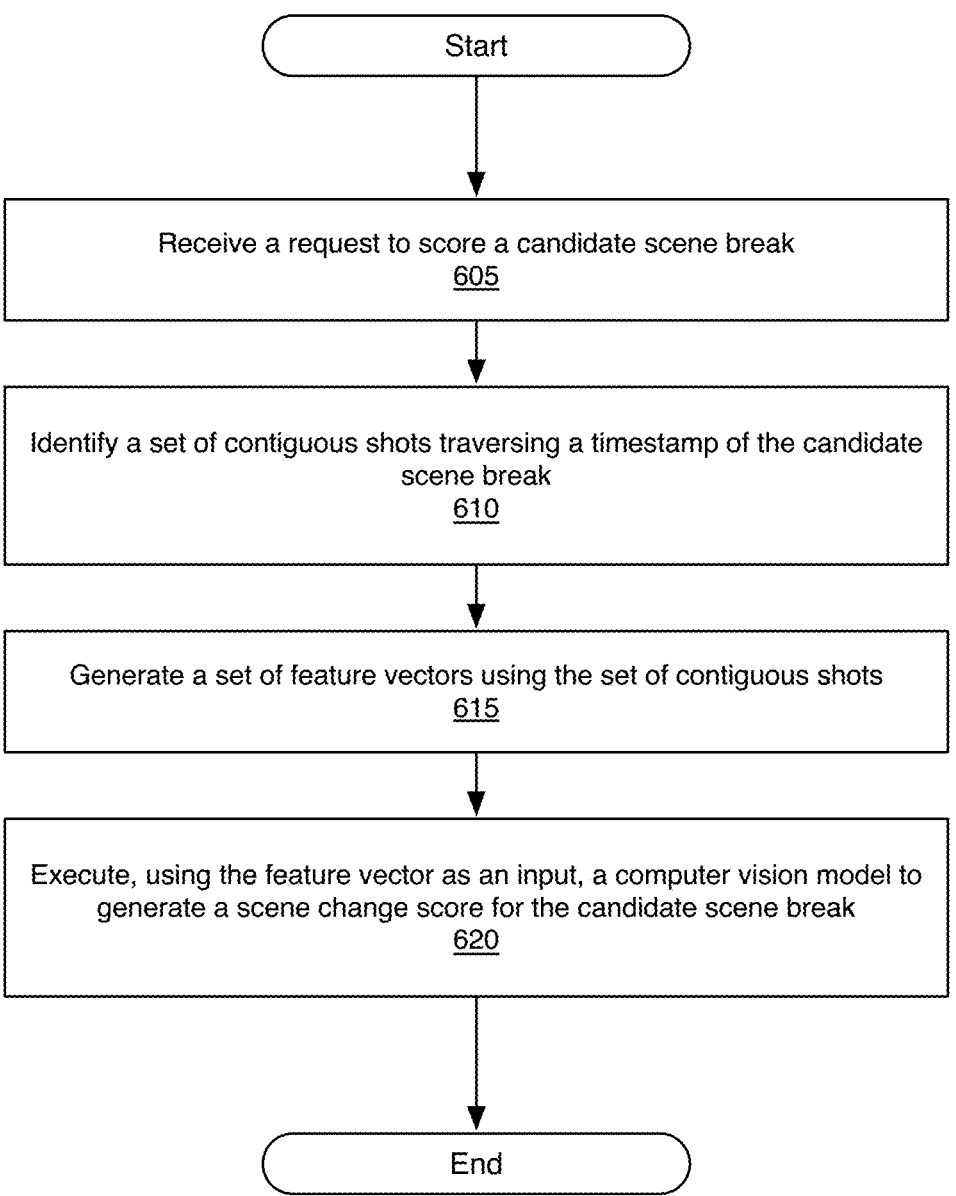

FIG. 6A shows a flowchart of a method for scene break detection using computer vision analysis. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 6A should not be construed as limiting the scope of the invention.

In STEP 605, a request is received to score a candidate scene break. The candidate scene break may correspond to a video shot that was detected using a video analysis and/or audio analysis process. Any number of other criteria could be used to prune and select from a set of shots of the video media in order to designate a set of shots as candidate scene breaks, for example.

In STEP 610, a set of contiguous shots traversing a timestamp of the candidate scene break are identified. This can be done according to a predefined parameter (e.g., an N parameter, described above) defining a number of surrounding shots for analysis of each shot.

In STEP 615, a set of feature vectors is generated for the candidate shot using the set of contiguous shots (e.g., N shots preceding the candidate shot and N shots including and succeeding the candidate shot). The feature vector can be any numeric representation of at least one visual attribute of the shot, and can be calculated as an aggregate of embeddings/vectors of the component frames of each shot.

In STEP 620, computer vision analysis is performed by executing a computer vision model to generate a scene change score for the candidate scene break using the feature vector as an input. Thus, the computer vision analysis generates a scoring indicating likelihood of a scene change occurring at the given shot/location in the media item.

Figure 6B:
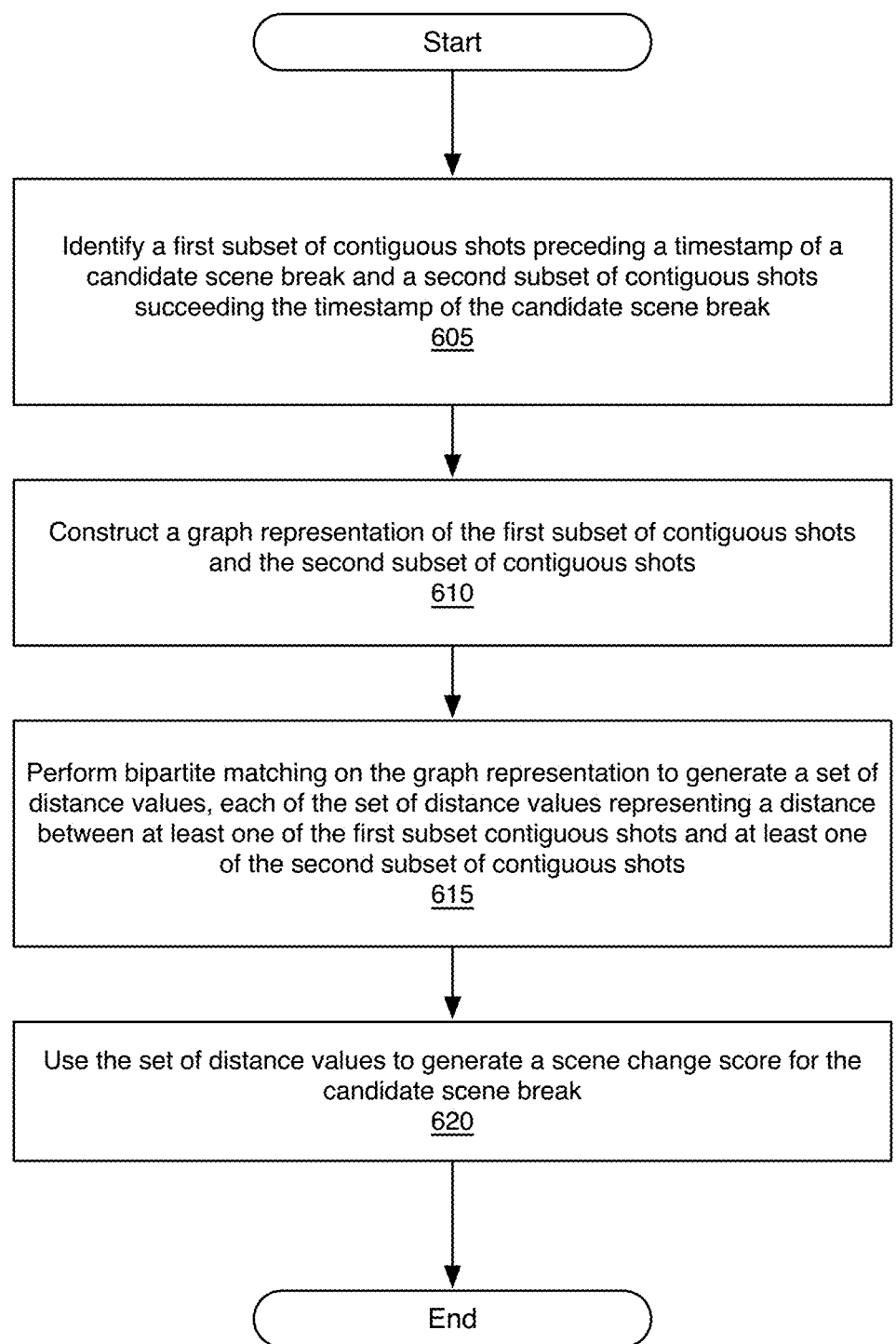

FIG. 6B shows another flowchart of a method for scene break detection using computer vision analysis. FIG. 6B is an example of a process for computer vision analysis depicted by STEP 620 of FIG. 6A. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 6B should not be construed as limiting the scope of the invention.

In STEP 605, a first subset of contiguous shots preceding a timestamp of a candidate scene break and a second subset of contiguous shots succeeding the timestamp of a candidate scene break are identified. In STEP 610, a graph representation of the first subset of contiguous shots and the second subset of contiguous shots is constructed. FIG. 7A depicts an example illustration of such a graph, with shots 8-12 representing the first subset and shots 13-17 representing the second subset.

In STEP 615, bipartite matching is performed on the graph representation to generate a set of distance values, each of the set of distance values representing a distance between at least one of the first subset of contiguous shots and at least one of the second subset of contiguous shots. In one example, bipartite matching calculates an optimal solution to the graph problem resulting in the set of distance scores that results in the smallest average. FIG. 7B depicts an example illustration of the calculation of such distance values.

In STEP 620, the set of distance values are utilized to generate a scene change score for the candidate scene break. The scene change score can be calculated as a simple average of the set of distance scores or some additional logic can be used to generate a final scene change score based at least on the set of distance scores from STEP 615, in accordance with various embodiments of the invention. This scene change score can then be utilized to identify the best candidate for a scene change among a set of candidate boundaries identified using video and audio analysis of the media file.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 9:
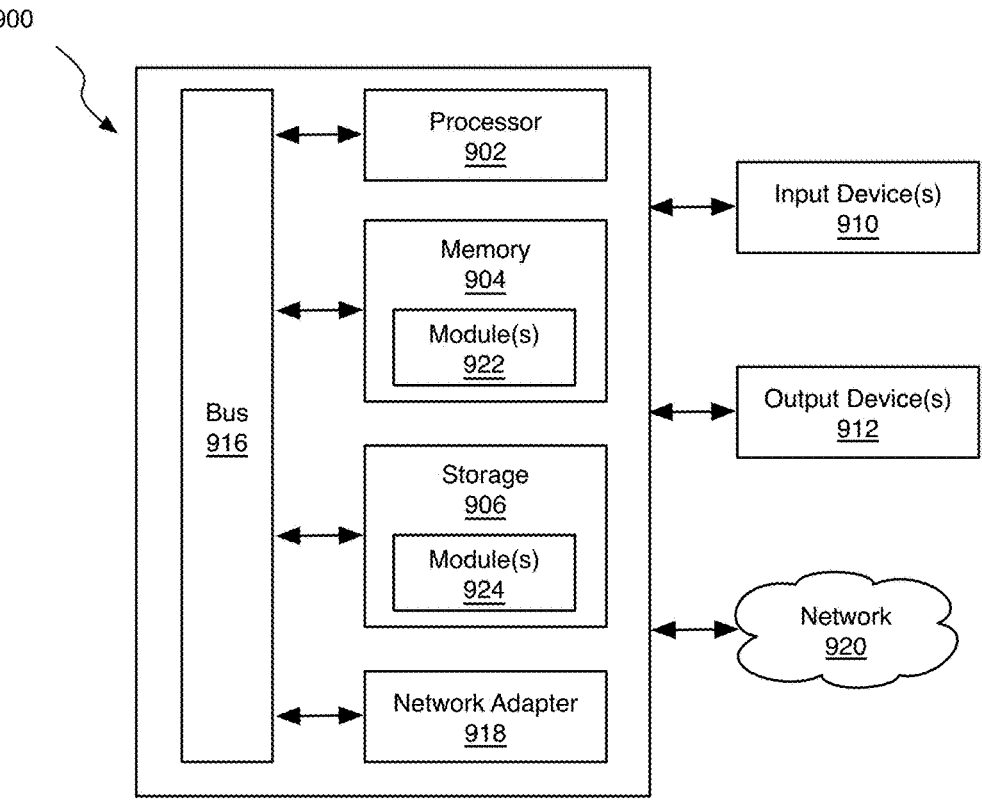
FIGS. 9 and 10 show a computing system and network architecture in accordance with one or more embodiments.

For example, as shown in FIG. 9, the computing system 900 may include one or more computer processor(s) 902, associated memory 904 (e.g., random access memory (RAM), cache memory, flash memory, etc.), one or more storage device(s) 906 (e.g., a hard disk, an optical drive such as a compact disk (CD) drive or digital versatile disk (DVD) drive, a flash memory stick, etc.), a bus 916, and numerous other elements and functionalities. The computer processor(s) 902 may be an integrated circuit for processing instructions. For example, the computer processor(s) may be one or more cores or micro-cores of a processor.

In one or more embodiments, the computer processor(s) 902 may be an integrated circuit for processing instructions. For example, the computer processor(s) 902 may be one or more cores or micro-cores of a processor. The computer processor(s) 902 can implement/execute software modules stored by computing system 900, such as module(s) 922 stored in memory 904 or module(s) 924 stored in storage 906. For example, one or more of the modules described herein can be stored in memory 904 or storage 906, where they can be accessed and processed by the computer processor 902. In one or more embodiments, the computer processor(s) 902 can be a special-purpose processor where software instructions are incorporated into the actual processor design.

The computing system 900 may also include one or more input device(s) 910, such as a touchscreen, keyboard, mouse, microphone, touchpad, electronic pen, or any other type of input device. Further, the computing system 900 may include one or more output device(s) 912, such as a screen (e.g., a liquid crystal display (LCD), a plasma display, touchscreen, or other display device), a printer, external storage, or any other output device. The computing system 900 may be connected to a network 920 (e.g., a local area network (LAN), a wide area network (WAN) such as the Internet, mobile network, or any other type of network) via a network interface connection 918. The input and output device(s) may be locally or remotely connected (e.g., via the network 920) to the computer processor(s) 902, memory 904, and storage device(s) 906.

One or more elements of the aforementioned computing system 900 may be located at a remote location and connected to the other elements over a network 920. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems and/or flowcharts. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

Figure 10:
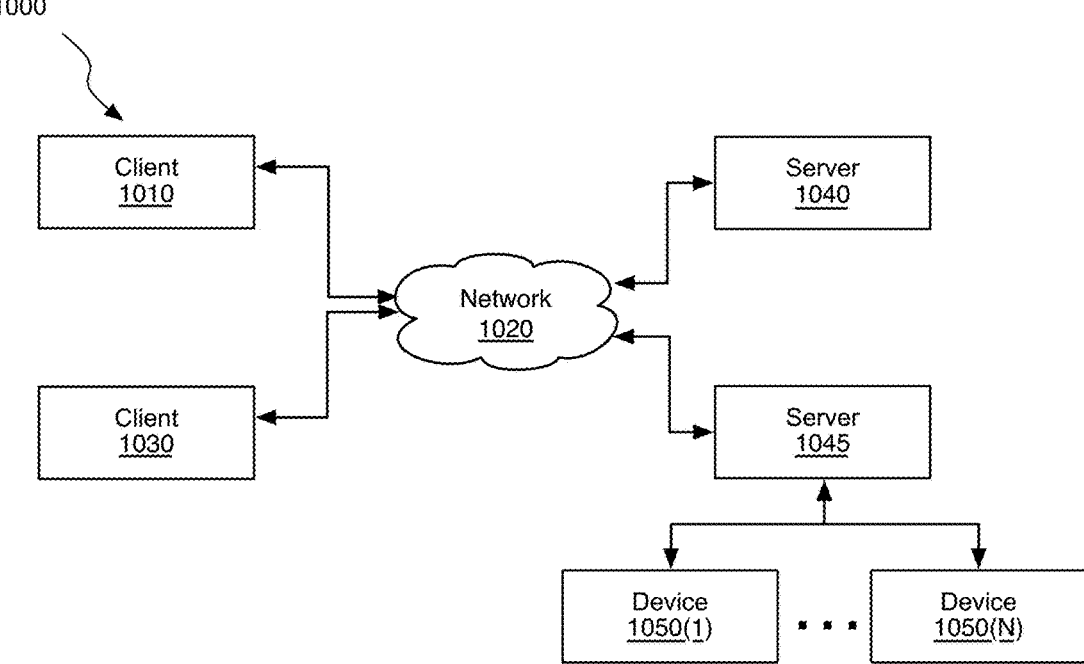

FIG. 10 is a block diagram of an example of a network architecture 1000 in which client systems 1010 and 1030, and servers 1040 and 1045, may be coupled to a network 1020. Network 1020 may be the same as or similar to network 1020. Client systems 1010 and 1030 generally represent any type or form of computing device or system, such as client devices (e.g., portable computers, smart phones, tablets, smart TVs, etc.).

Similarly, servers 1040 and 1045 generally represent computing devices or systems, such as application servers or database servers, configured to provide various database services and/or run certain software applications. Network 1020 generally represents any telecommunication or computer network including, for example, an intranet, a wide area network (WAN), a local area network (LAN), a personal area network (PAN), or the Internet.

With reference to computing system 1000 of FIG. 10, a communication interface, such as network adapter 1018, may be used to provide connectivity between each client system 1010 and 1030, and network 1020. Client systems 1010 and 1030 may be able to access information on server 1040 or 1045 using, for example, a Web browser, thin client application, or other client software. Such software may allow client systems 1010 and 1030 to access data hosted by server 1040, server 1045, or storage devices 1050(1)-(N). Although FIG. 10 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 1040, server 1045, storage devices 1050(1)-(N), or any combination thereof. All or a portion of one or more of the example embodiments disclosed herein may also be encoded as a computer program, stored in server 1040, run by server 1045, and distributed to client systems 1010 and 1030 over network 1020.

Although components of one or more systems disclosed herein may be depicted as being directly communicatively coupled to one another, this is not necessarily the case. For example, one or more of the components may be communicatively coupled via a distributed computing system, a cloud computing system, or a networked computer system communicating via the Internet.

And although only one computer system may be depicted herein, it should be appreciated that this one computer system may represent many computer systems, arranged in a central or distributed fashion. For example, such computer systems may be organized as a central cloud and/or may be distributed geographically or logically to edges of a system such as a content/data delivery network or other arrangement. It is understood that virtually any number of intermediary networking devices, such as switches, routers, servers, etc., may be used to facilitate communication.

One or more elements of the aforementioned computing system 1000 may be located at a remote location and connected to the other elements over a network 1020. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

One or more elements of the above-described systems (e.g., FIGS. 1A and 1B) may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1A and 1B) and/or flowcharts (e.g., FIGS. 2-6B). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A system for computer vision analysis of a media item, comprising:
   a computer processor;
   a scene break detection service executing on the computer processor and comprising functionality to:
      receive a request for scene break detection on the media item;
      identify a set of candidate scene break timestamps selected based on analysis of an audio component of the media item and a video component of the media item;
      execute a computer vision scoring model for each candidate scene break timestamp of the set of candidate scene break timestamps by:
         identifying a first set of proximal frames preceding the candidate scene break timestamp and a second set of proximal frames succeeding the candidate scene break timestamp;
         calculating a score for the candidate scene break timestamp representing a visual distance between the first set of proximal frames and the second set of proximal frames; and
      select, based at least on the score of each of the set of candidate scene break timestamps, a final set of scene break timestamps for the media item.

2. The system of claim 1, wherein the first set of proximal frames are contiguous frames of a preceding shot, and wherein the second set of proximal frames are contiguous frames of a succeeding shot.

3. The system of claim 1, wherein the system further comprises a media preview generation service configured to:
   obtain a request for media preview generation for the media item;
   identify a duration corresponding to the request for media preview generation; and
   select, based on the duration, at least one segment of the media item between two timestamps of the final set of scene break timestamps as a media preview clip.

4. The system of claim 3, wherein the two timestamps of the final set of scene break timestamps are adjacent, and wherein the media preview clip is provided for display in relation to the media item to one or more end users by a client device.

5. The system of claim 3, wherein selecting the at least one segment of the media item comprises:

identifying a set of candidate segments of the media item based on the final set of scene break timestamps and a set of predefined criteria for media preview generation;

providing the set of candidate segments for human selection;

receiving a selection of a subset of the set of candidate segments obtained from a human administrator; and constructing the media preview clip using the subset of the set of candidate segments based on the selection.

6. The system of claim 3, wherein selecting the at least one segment of the media item comprises:

identifying a set of candidate segments of the media item based on the final set of scene break timestamps and a set of predefined criteria for media preview generation;

for each candidate segment of the set of candidate segments:

generating a set of feature vectors each depicting at least one visual attribute of the candidate segment;

executing a machine learning model to infer a visual category for the candidate segment, wherein the visual category is selected from a set of visual categories;

selecting a contiguous subset of the set of candidate segments having a common inferred visual category; and constructing the media preview clip using the contiguous subset of the set of candidate segments.

7. The system of claim 1, wherein the system further comprises media preview generation service configured to:

obtain a request for advertising media clip generation for the media item;

identify a duration corresponding to the request; and select, based on the duration, a segment of the media item between two timestamps of the final set of scene break timestamps as an advertising media clip.

8. The system of claim 7, wherein selecting the segment of the media item comprises:

identifying a set of candidate segments of the media item based on the final set of scene break timestamps and a set of predefined criteria for advertising media clip generation;

for each candidate segment of the set of candidate segments:

generating a set of feature vectors each comprising at least one visual attribute of the candidate segment, a set of actor attributes, and a genre attribute;

executing, based on the set of feature vectors, a machine learning model to infer a virality score for the candidate segment;

determining that the segment has a highest virality score among the set of candidate segments; and constructing the advertising media clip using the segment, wherein the advertising media clip is provided for display in an advertisement for the media item.

9. The system of claim 1, wherein the scene break detection service further comprises functionality to:

perform shot detection on the video component of the media item to obtain a set of shots, each comprising a set of contiguous frames of the media item;

select the set of candidate scene break timestamps by comparing shot boundaries of the set of shots with a set of audio break timestamps identified based on aurally similar segments of the audio component.

10. The system of claim 1, wherein executing the computer vision scoring model for each candidate scene break timestamp of the set of candidate scene break timestamps further comprises:

constructing a graph representation of the first set of proximal frames and the second set of proximal frames; and wherein calculating a score for the candidate scene break timestamp comprises performing bipartite matching on the graph representation to generate a set of distance values, each of the set of distance values representing a proximal distance between at least one of the first set of proximal frames and at least one of the second set of proximal frames, wherein the score for each of the candidate scene break timestamps is an average of the set of distance values.

11. The system of claim 1, wherein selecting the final set of scene break timestamps comprises:

identifying a set of dynamic programming heuristic rules for scene break selection;

using the set of dynamic programming heuristic rules to generate a ranking of at least a subset of the set of candidate scene break timestamps; and selecting the final set of scene break timestamps based on the ranking.

12. A method for computer vision analysis of a media item, comprising:

receiving a request for scene break detection on the media item;

identifying a set of candidate scene break timestamps selected based on analysis of an audio component of the media item and a video component of the media item;

executing, by a computer processor, a computer vision scoring model for each candidate scene break timestamp of the set of candidate scene break timestamps by:

identifying a first set of proximal frames preceding the candidate scene break timestamp and a second set of proximal frames succeeding the candidate scene break timestamp;

calculating a score for the candidate scene break timestamp representing a visual distance between the first set of proximal frames and the second set of proximal frames; and selecting, based at least on the score of each of the set of candidate scene break timestamps, a final set of scene break timestamps for the media item.

13. The method of claim 12, wherein the first set of proximal frames are contiguous frames of a preceding shot, and wherein the second set of proximal frames are contiguous frames of a succeeding shot.

14. The method of claim 12, further comprising:

obtaining a request for media preview generation for the media item;

identifying a duration corresponding to the request for media preview generation; and selecting, based on the duration, at least one segment of the media item between two timestamps of the final set of scene break timestamps as a media preview clip.

15. The method of claim 14, wherein the two timestamps of the final set of scene break timestamps are adjacent, and wherein the media preview clip is provided for display in relation to the media item to one or more end users by a client device.

16. The method of claim 12, further comprising:

obtaining a request for advertising media clip generation for the media item;

identifying a duration corresponding to the request; and selecting, based on the duration, a segment of the media item between two timestamps of the final set of scene break timestamps as an advertising media clip.

17. The method of claim 16, wherein selecting the segment of the media item comprises:

identifying a set of candidate segments of the media item based on the final set of scene break timestamps and a set of predefined criteria for advertising media clip generation;

for each candidate segment of the set of candidate segments:

generating a set of feature vectors each comprising at least one visual attribute of the candidate segment, a set of actor attributes, and a genre attribute;

executing, based on the set of feature vectors, a machine learning model to infer a virality score for the candidate segment;

determining that the segment has a highest virality score among the set of candidate segments; and constructing the advertising media clip using the segment, wherein the advertising media clip is provided for display in an advertisement for the media item.

18. The method of claim 12, further comprising:

performing shot detection on the video component of the media item to obtain a set of shots, each comprising a set of contiguous frames of the media item;

selecting the set of candidate scene break timestamps by comparing shot boundaries of the set of shots with a set of audio break timestamps identified based on aurally similar segments of the audio component.

19. The method of claim 12, wherein executing the computer vision scoring model for each candidate scene break timestamp of the set of candidate scene break timestamps further comprises:

constructing a graph representation of the first set of proximal frames and the second set of proximal frames; and wherein calculating a score for the candidate scene break timestamp comprises performing bipartite matching on the graph representation to generate a set of distance values, each of the set of distance values representing a proximal distance between at least one of the first set of proximal frames and at least one of the second set of proximal frames, wherein the score for each of the candidate scene break timestamps is an average of the set of distance values.

20. A non-transitory computer-readable storage medium comprising a plurality of instructions for computer vision analysis of a media item, the plurality of instructions configured to execute on at least one computer processor to enable the at least one computer processor to:

receive a request for scene break detection on the media item;

identify a set of candidate scene break timestamps selected based on analysis of an audio component of the media item and a video component of the media item;

execute a computer vision scoring model for each candidate scene break timestamp of the set of candidate scene break timestamps by:

identifying a first set of proximal frames preceding the candidate scene break timestamp and a second set of proximal frames succeeding the candidate scene break timestamp;

calculating a score for the candidate scene break timestamp representing a visual distance between the first set of proximal frames and the second set of proximal frames; and select, based at least on the score of each of the set of candidate scene break timestamps, a final set of scene break timestamps for the media item.

* * * * *